United States Patent [19]

Ruckl et al.

[11] Patent Number: 5,781,224
[45] Date of Patent: Jul. 14, 1998

[54] DEVICE FOR PRODUCING A SCREEN PRINTING STENCIL

[75] Inventors: Siegfried Ruckl, Langkampfen; Harald Kapfinger, Kirchbirchl, both of Austria

[73] Assignee: Schablonentechnik Kufstein Aktiengesellschaft, Kufstein, Austria

[21] Appl. No.: 677,873

[22] Filed: Jul. 10, 1996

Related U.S. Application Data

[62] Division of Ser. No. 427,814, Apr. 26, 1995.

[30] Foreign Application Priority Data

Apr. 26, 1994 [EP] European Pat. Off. ............ 94106498

[51] Int. Cl.⁶ ........................................................ B41J 2/47
[52] U.S. Cl. ........................................ 347/248; 347/264
[58] Field of Search ........................ 347/262, 264, 347/248, 234, 139, 258; 107/126, 127, 127.1; 219/121.68; 101/128.4

[56] References Cited

U.S. PATENT DOCUMENTS

| | | | |
|---|---|---|---|
| 3,825,323 | 7/1974 | Landwer | 347/258 |
| 4,785,733 | 11/1988 | Hartung et al. | 101/181 |
| 4,806,727 | 2/1989 | Ruckl | 219/121.68 |
| 4,878,127 | 10/1989 | Zollman et al. | 101/128.4 |
| 4,944,826 | 7/1990 | Zollman et al. | 101/128.21 |
| 4,948,940 | 8/1990 | Ruckl | 219/121.68 |

FOREIGN PATENT DOCUMENTS 3116654  11/1982  Germany ............... 101/DIG. 36

Primary Examiner—Mark J. Reinhart

[57] ABSTRACT

In the production of a screen printing stencil, a thin-walled hollow cylinder having a light responsive layer on the outside is rotated about its cylinder axis and exposed by means of a laser beam impinging on it. The laser beam is focused in the region of the light responsive layer. The laser beam is moved in the direction of the cylinder axis, and is switched on and off in agreement with a desired stencil pattern. A radial deviation of the actual position of the wall of the hollow cylinder from its ideal position is determined from at least one measuring position fixed relative to the laser beam for a multiplicity of circumferential positions of the hollow cylinder. A first actuating signal is then derived from at least one of the radial positional deviations obtained at the measuring positions. The stencil pattern is displaced in accordance with the first actuating signal in the circumferential direction of the hollow cylinder for the purpose of compensating a tangential deviation of the hollow cylinder wall from its ideal position.

6 Claims, 9 Drawing Sheets

DEVICE FOR PRODUCING A SCREEN PRINTING STENCIL

This application is a divisional of copending application Ser. No. 08/427,814, filed on Apr. 26, 1995, the entire contents of which are hereby incorporated by reference.

FIELD OF THE INVENTION

The invention relates to a method and device for accurately producing a screen printing stencil by compensating for deviations.

DESCRIPTION OF RELATED ART

Present methods for producing a screen producing stencil includes exposing a thin-walled hollow cylinder bearing a lacquer layer on the outside, while rotating the cylinder about its cylinder axis, by means of a laser beam impinging on it, the focus of the laser beam coming to lie in the region of the lacquer layer. The laser beam itself is moved in the direction of the cylinder axis and is also switched on and off in agreement with a desired stencil pattern, in order to transfer this stencil pattern into the lacquer layer.

The device used for this purpose has a bearing device which serves the purpose of rotatably accommodating the thin-walled hollow cylinder. Furthermore, a carriage is present which can be displaced along the cylinder axis of for deflecting the laser beam onto the lacquer layer. A switching device is used to undertake the switching on and off of the laser beam in agreement with the stencil pattern stored in a storage device.

SUMMARY OF THE INVENTION

It is the object of the invention to produce the stencil pattern on the screen printing stencil even more accurately.

This and other objects of the invention are fulfilled by providing a method of fixing at least one measuring position relative to the laser beam; determining a radial deviation of the actual position of the wall of the hollow cylinder from its ideal position for a multiplicity of circumferential positions of the hollow cylinder; and deriving a first actuating signal from at least one of the radial positional deviations obtained at the measuring position, in order to compensate for a tangential deviation of the hollow cylinder wall from its ideal position to displace the stencil pattern in the circumferential direction of the hollow cylinder.

Form variations in the hollow cylinder which are caused by the static and/or dynamic influences and which can lead to an undesired displacement of the cylinder surface relative to the laser beam can be compensated in this way, with the result that the stencil pattern generated on the hollow cylinder agrees even more accurately with the desired stencil patterns, which may be stored in an electronic memory.

According to an advantageous embodiment of the method of the present invention, the method may further include deriving a second actuating signal at least from the radial positional deviation at the measuring position, in order to adjust the focus of the laser beam in the radial direction after the hollow cylinder has rotated over a circumferential section corresponding to the angular distance between the measuring position and the laser beam, in order to compensate this radial positional deviation.

The focus of the laser beam can thus always be held in the region of the light responsive layer by means of this measure, even if the cylinder surface were to be moved in the radial direction by static and/or dynamic influences, as a result of which a more accurate stencil pattern is likewise obtained.

The objects of the present invention are also fulfilled by providing a device including an optics carriage on which at least one sensor for measuring a radial deviation of the actual position of the wall of the hollow cylinder from its ideal position is mounted, as well as adjusting means which carry out a tangential displacement of the stencil pattern as a function of the measured positional deviation. This tangential displacement can be performed by electrical adjusting means which ensure an earlier or later retrieval of the stencil pattern from the storage device, in order in this way to compensate the form variation of the hollow cylinder in the tangential direction.

However, it is also possible to use as adjusting means electromechanical adjusting means which appropriately deflect the laser beam impinging on the hollow cylinder in the circumferential direction of the hollow cylinder. It is also possible to use further adjusting means to carry out an adjustment of the focus of the laser beam in the radial direction relative to the hollow cylinder as a function of the measured radial positional deviation, in order to compensate for radial form variations of the hollow cylinder from its ideal circular form.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
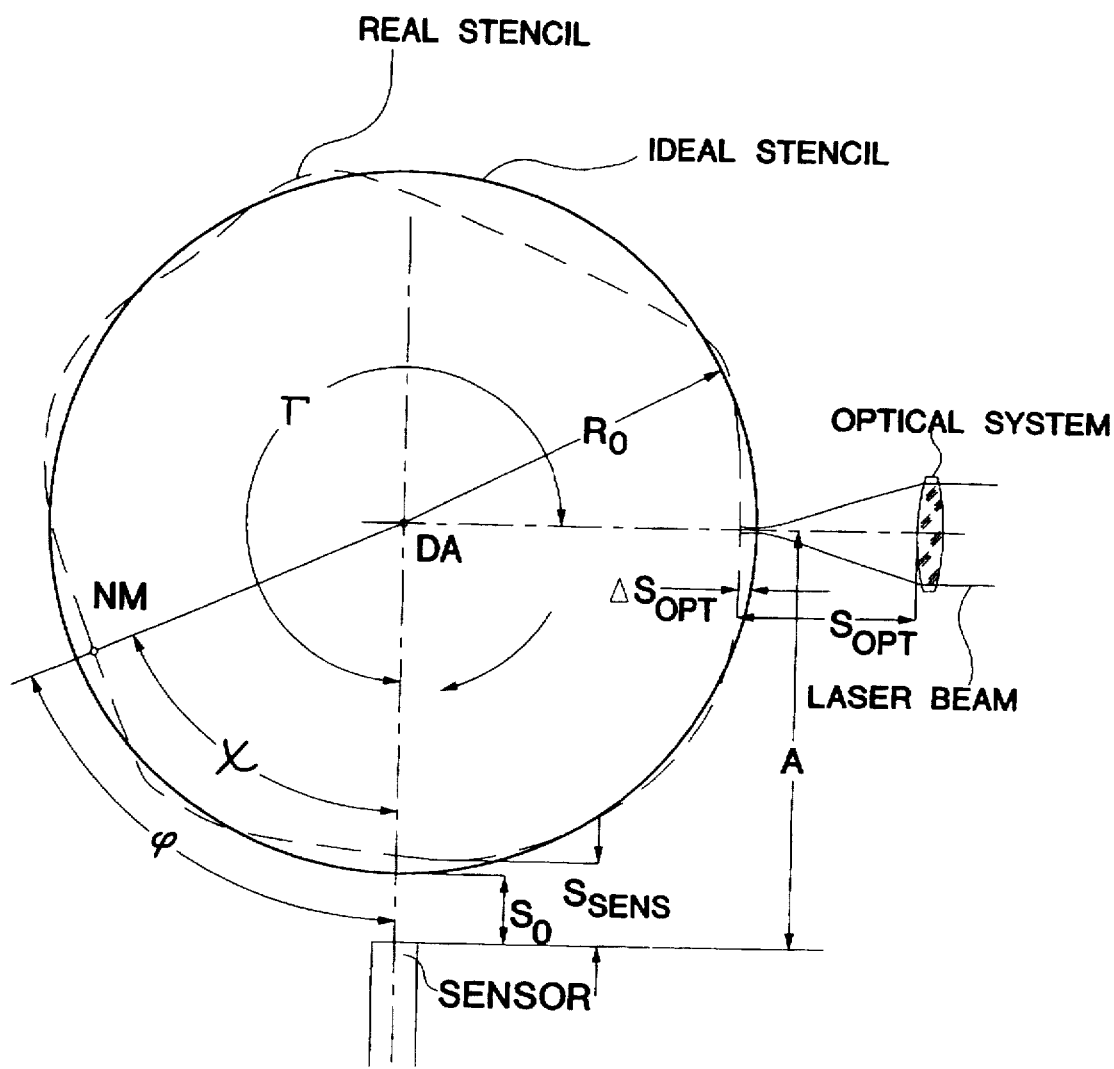
FIG. 1 illustrates form errors in the case of a real screen printing stencil.

When engraving circular cylindrical screen printing stencils on a machine specifically for this purpose, i.e., an engraving machine, an accurate concentricity is very important for the error-free matching of the different colors which are printed by means of a set of such stencils. Deviations of the cross-sections of the stencil from the circular shape and eccentric positions of the center of a cross-sectional circle with respect to the axis of rotation of the engraving machine cause pattern images on the screen cylinder which are inaccurately engraved and displaced in the circumferential direction.

Giving consideration to a real round stencil, that is to say a very thin-walled perforated circular hollow cylinder, for example, which normally has a diameter of 200 to 300 mm, a length of 1000 to 3000 mm and a wall thickness of 0.1 mm, it may be stated that with respect to the targeted circular cylindrical shape, the real round stencil has form variations which can amount to a few tenths of a millimeter. Of course, when determining these from variations, it is important how the hollow cylinder is clamped during the measurement. If, for example, the round stencil is placed with one of its end cross-sections on the ground, the form variations of the real round stencil can even increase up to a few millimeters with respect to an ideal circular cylinder of the same size. It was assumed in the case of the above information on the form variations that the two end faces of the stencil were retained by accurately concentric clamping devices, e.g., the faces were clamped on accurately concentric internal chucks, or that concentric conical end pieces of the type of the workholding centers of a lathe engage in the open end faces of the stencil.

Given appropriately accurate design of these clamping devices, the thin round stencil will exhibit a sufficiently slight eccentricity at its ends, but will show ever stronger deviations from concentricity towards its center because of internal stresses. If these deviations are measured by means of a contactless measuring method, for example inductively or optically, a the radial eccentricities of a few tenths of a millimeter already mentioned above are found towards the center of the stencil. The measurement of the radial eccentricities is finally intended to permit compensation of these errors by suitable technical measures, with the result that engraving errors are avoided. The measuring device is denoted here as a sensor, and is intended to sense optically or inductively, but any contactless method may be used to establish the perpendicular distance between a reference point permanently connected to it and the stencil wall moving past.

Physical variables of the environment of the stencil influence the radial eccentricities, as a result of which these deviations from internal stresses are either amplified r diminished. Thus, for example, a pressure which is applied in any way at all to the inside of the stencil acts on the latter to round it out, i.e., the stencil is more closely approximated to the shape of a circular cylinder by the membrane stresses which form.

Temporarily variable forces acting on the stencil excite the latter to vibrations, and can amplify the deviations. Such forces are released, for example, by poor rotary actuators. As experiments have shown, these dynamic deviations of the hollow cylinder wall from concentricity, which are superimposed on the static form errors, can likewise be diminished by a pressure acting on the inside of the stencil. The pressure evidently dampens the vibrations of the stencil, something which will be discussed further below. However, it is not mandatory.

The geometrical description of the errors requires suitable coordinates to be established with respect to the stencil and the measuring device. Each stencil bears somewhere on its circumference a zero mark or a passer mark whose position is initially fixed arbitrarily, but remains permanently connected to the stencil. The polar coordinate system likewise permanently connected to the stencil can be defined by means of this mark in the following way, as is explained with the aid of FIG. 1:

The origin of the coordinate system lies on the axis of rotation DA of the stencil.

The radial direction is normal to this axis.

The angle $\chi=0$ is given by the connection with the zero mark indicated at NM.

The orientation of the angular coordinate $\chi$ is such that values for $\chi$ are to be counted positive when they point against the direction of rotation of the stencil.

The angular position $\phi$ of the rotating stencil with respect to the sensor is measured between the latter and the zero mark provided on the stencil. It holds under these preconditions that $$\phi = \chi \qquad (1)$$

In the case of all engraving machines, provision is made for the purpose of measuring the angle $\phi$ of rotation of an encoder which transmits a zero pass agreeing with the position of the zero mark, and, in addition, subdivides the angle of a full rotation (360 degrees=$2\pi$) into $N_{um}$ pulses. The $N_{um}$-th pulse of the preceding rotation is transmitted in congruence with the zero pulse of the following rotation. In order to convert from the angle $\phi$ of rotation to the k-th pulse, and vice versa, relations $$\phi = \frac{k}{N_{um}} \cdot 2\pi \text{ or } k = \frac{\phi}{2\pi} \cdot N_{um} \qquad (2)$$

or $$\phi = \frac{k}{N_{um}} \cdot 360 \text{ or } k = \frac{\phi}{360} \cdot N_{um} \qquad (3)$$

can be formed. Since k can only be an integer, it is necessary in the case of this angle measuring technique to be limited to discrete, but certainly very fine, angular steps for $\phi$.

The description of the error picture is best done by expanding the deviations, occurring over one rotation of the stencil, in the radius of the real stencil with respect to an ideal stencil, that is to say a circular cylindrical stencil, mounted concentrically with respect to the axis of rotation, having the constant radius $R_0$ in a Fourier series.

$$R(\chi) = R_0 + \sum_{i=1}^{m} a_i \cdot \cos(i \cdot \chi) + b_i \cdot \sin(i \cdot \chi) = R_0 + \sum_{i=1}^{m} c_i \cdot \cos(i \cdot \chi + \epsilon_i) \qquad (4)$$

This is the representation of the stencil radius in the defined stencil-fixed coordinate system. The distance measured from the sensor to the rotating real stencil is then $s(\chi)=A-R(\chi)$ and with the use of the angular position $\phi$ between the zero mark and the sensor it holds because of equation (1) that $$s_{sens}(\phi) = A - R_0 - \sum_{i=1}^{m} [a_i \cdot \cos(i \cdot \phi) + b_i \cdot \sin(i \cdot \phi)] = \qquad (5)$$

$$A - R_0 - \sum_{i=1}^{m} c_i \cdot \cos(i \cdot \phi + \epsilon_i) =$$

$$S_0 - \sum_{i=1}^{m} c_i \cdot \cos(i \cdot \phi + \epsilon_i)$$

In this representation, the series term of the zeroth order $s_0 = A - R_0$ is the distance of the sensor from the ideal stencil. The term of first order $c_i$ corresponds to a simple eccentricity of the center of the cross-sectional circle of the stencil which has just been measured. The term $c_i$ can also be of considerable magnitude in the case of an accurately circular cylindrical cross-section. When looking at a few cross-sections of the stencil which follow one another in the longitudinal direction, the terms of first order respectively applying to these cross-sections correspond to a deviation in the longitudinal axis of the stencil from a straight line, and thus represent a bending of this longitudinal axis. It is to be noted that this bending cannot be diminished by a pressure on the inside of the stencil.

The series term of second order corresponds to a deviation in the cross-section resulting in an oval, and can be led towards zero even by slight pressure actions on the inside of the stencil. The series term of third order corresponds to a deviation of the stencil cross-section from concentricity resulting in a triangle, and can likewise be compensated by an internal pressure. A similar statement holds for all the following deviations of higher order. However, the compensation of the radial eccentricity requires a higher internal pressure the higher the Fourier order of deviation. It can be shown that the radial eccentricities can be returned to zero completely only by an infinitely high internal pressure. In the case of a finite internal pressure, a residual error remains which is proportional to the amplitude $c_i$ of the error series term, which can be established in the case of a stencil without internal pressure.

Measuring and processing the radial eccentricity in the case of a stencil stabilized and rounded out by internal pressure:

It is now presupposed that a round stencil is present which is largely rounded out by a pressure acting on its interior, and which also does not vibrate because of this internal pressure. The stabilization by means of internal pressure can be explained as follows, for example. Vibrations of a thin circular cylindrical membrane are produced in such a way that the cross-sectional surface bordered by the membrane is then accurately circular and therefore at a maximum when the instantaneous value of the amplitudes of vibration passes precisely through zero. Every deviation caused by a vibration reduces the internal cross-section of the stencil, as a result of which either the gas located in the interior of the stencil is compressed, or this gas, due to a slight rise in pressure, is caused to flow more quickly out of the stencil through bores which has already been opened. Energy is extracted from the vibration process thereby, which means that vibrations of the thin membrane are damped by the gas cushion in the stencil interior.

This statement does not, however, hold for flexural vibrations of the stencil, in the case of which the individual cross-sections of the stencil remain circular. These vibrations are counteracted by the internal material damping. In addition, as a consequence of the large planar moment of inertial of the stencil cross-sections and the slight mass of the stencil, the frequency of the natural flexural vibrations is so high from the start that its form of vibration is scarcely excited.

In the case of a stencil on which an internal pressure acts, the remaining radial eccentricities will be established only as those which are conditioned by the bending of the stencil axis, i.e., the eccentricities of the individual cross-sections of the stencil. During engraving of the real stencil, these eccentricities cause geometrical errors in the pattern image generated, i.e., deviations in the position and the form of the pattern image with respect to one which would be engraved on an ideal, concentrically running and accurately circular cylindrical stencil. These geometrical errors consist, firstly, of a displacement of the position of the engraved image in the circumferential direction, and, secondly, of a change in width of the engraved lines generated. The latter are caused by radial distance changes in the stencil wall with respect to the optical system which focuses the laser beam.

Figure 2:
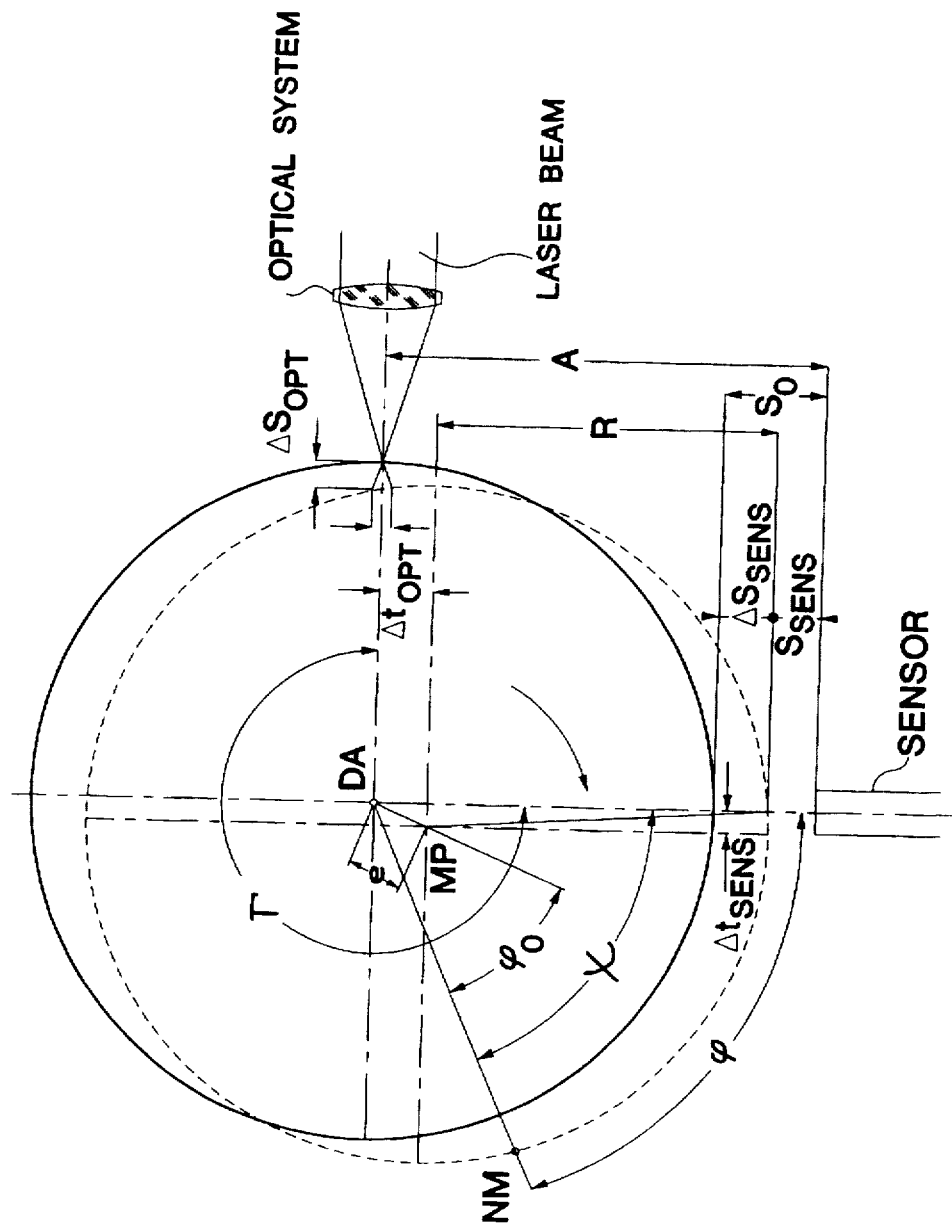
FIG. 2 illustrates changes in the case of a circular cylindrical screen printing stencil mounted eccentrically relative to an axis of rotation.

On the basis of the designations of FIG. 2, it follows from equation (5) for the distance change in the stencil wall of the real stencil by comparison with the ideal stencil at the location of the sensor that $$\Delta s_{sens} = s_0 - s_{sens}(\phi) = c_1 \cdot \cos(\phi - \epsilon_1) \quad (6)$$

As may be seen from equation (6, $\Delta s_{sens}$ can also assume negative values. If the stencil has rotated further by the angle $\Gamma$ by comparison with the instantaneous position shown in FIG. 2, this is also the change which must be impressed on the optical system in order for the distance between the optical system and the stencil to remain constant and no depth of focus errors can arise. From a direct geometrical consideration with the aid of FIGS. 1 and 2, the radial distance change is defined as $$\Delta s_{sens} = e \cdot \cos(\phi - \epsilon_1) \quad (7)$$

The result for the displacement of the wall of the actual stencil in the circumferential direction by comparison with the ideal stencils is $$\Delta t_{sens} = e \cdot \sin(\phi - \epsilon_1) \quad *8)$$

It is seen from a comparison with equation (6) that the eccentricity e corresponds to the amplitude $c_i$. It is necessary to correct both incorrect positions for a geometrically correct pattern application. The angle $\epsilon_1$ also appears in addition to the angle $\phi$ of rotation in equations (7) and (8). This angle $\epsilon_1$ designates the phase position of the maximum of the first series term in the original Fourier expansion (4) and (5). This corresponds to the angular position of the eccentricity of the real stencil cross-section with respect to the zero mark.

Equations (7) and (8) also show that the fluctuation in the pattern in the circumferential direction leads, with respect to the fluctuation in the distance of the stencil wall in the radial direction, by an angle of rotation of 90 degrees, i.e., a $N_{um}/4$ encoder pulses. This means that the value of the pattern fluctuation in the circumferential direction was already filed earlier by $N_{um}/4$ encoder pulses, specifically in a memory whose address is smaller by precisely this number. Considering that at the engraving point, the same distance fluctuations occur in the case of the optical system as in the case of the sensor, only phase-shifted by the angle $\Gamma$ of rotation, it is possible to set up the following rule in order to prevent engraving errors.

In order to compensate the errors in the pattern image of a stencil which rotates with an eccentricity e but is otherwise circularly cylindrical, the radial distance $s_{sens}$ is measured by means of a ranging sensor. Furthermore, the difference value $\Delta s_{sens} = s_0 - s_{sens}$ is formed and this value is filed in the memory location k as $\Delta s_{sens}(k)$. After a further $$N_\Gamma = N_{um} \cdot \Gamma / 2\pi \quad (9)$$

pulses received from the encoder, this value is read out again from the memory location k and is impressed on the optical system, which focuses the laser beam, as a radial actuating pulse. This state of affairs can be represented by the following symbolic rotation:

$$\Delta s_{opt}(k+N_T) = \Delta s_{sens}(k) \qquad (10)$$

The notation employed is intended to signify: extract the content $\Delta s_{sens}(k)$ from the memory location k upon receiving the $<k+N_T>$ -th pulse, and impress it on the optical system as actuator travel.

Furthermore, likewise upon receiving the $<k+N_T>$ -th pulse, the content of the memory location with the address $k-N_{um}/4$ (this contains the value $\Delta s_{sens}$ stored earlier by a quarter turn), is extracted and used to determine the pattern displacement in the circumferential direction. This is described symbolically by $$\Delta t_{opt}(k+N_T) = \Delta s_{sens}(k-N_{um}/4) \qquad (11)$$

Now equation (11) is used to calculate the corrected address of the memory location for the pattern information. If the value $\Delta s_{sens}(k-N_{um}/4) > 0$, the retrieval of the pattern information must lead, i.e., the pattern information provided at other memory locations for the purpose of controlling the laser beam must be extracted from a memory location whose address is higher by the integer $$\frac{\Delta t_{opt}}{2 \cdot \pi \cdot R_0} \cdot N_{um} \qquad (12)$$

than the memory location number for the ideal stencil. In equation (12), the value $\Delta t_{opt}$ corresponds to the value of the relationship in equation (11). If, inversely, the value $\Delta s_{sens}(k-N_{um}/4) < 0$, the memory address read out for the purpose of clearing the pattern information must be smaller by the amount, which follows from equation (12), than the memory location number would be for the ideal stencil.

A further short comment on the use of the manipulated variable determined for the optical system is provided below. The radial positional error of the stencil wall is compensated owing to the fact that, in accordance with the manipulated variable $\Delta s_{opt}$ determined, the optical system is adjusted in the direction of its optical axis. In the case of the relationships considered here, this is, however, a relatively slow movement, since it was, after all, assumed that only the error of first order remains thanks to the application of internal pressure to the stencil. The optical system must then be moved only at a frequency corresponding to the rotational speed of the stencil, and the speed and frequency are 15 Hz for a rotational speed of the stencil of 900 rev/min. Of course, the pattern position could likewise be corrected in the circumferential direction by adjusting the optical system. However, preference is given to the later or earlier retrieval, possible without inertia, of the pattern information from the semiconductor memory of the computer.

Measuring and processing the radial eccentricity in the case of an unpressurized stencil which is not exposed to the excitation of vibrations:

Consideration with now be given to the relationships in the case of a stencil which is held at both its ends by two accurately concentric clamping devices, and to which an excess pressure is not applied on its inside. The rotary actuator of the stencil is to be constructed to be entirely precision balanced, for example owing to the fact that the drive is performed via damping V-shaped or flat belts, and that also all the belt pulleys and shafts are very well balanced and the driving motor outputs a very uniform torque, with the result that no membrane vibrations of the stencil wall are to occur.

In the case of such a stencil, it is necessary to expect radial eccentricities whose Fourier representation still contains substantial values for the series terms of higher order by comparison with a stencil such as has already been treated above. All these radial eccentricities are of a static nature, i.e. they rotate with the stencil, or, in other words they do not change in a national coordinate system permanently connected to the stencil.

Once the compensating paths have been determined, the compensation then requires very quickly reacting actuating mechanisms, such as actuating elements which are based on piezoelectric effects, because the frequency of the compensating movement must correspond to a value which is equal to the rotational speed multiplied by the order of the respective Fourier term. This holds, in particular, for compensating the incorrect radial position of the stencil wall. The incorrect position of the pattern in the circumferential direction can be corrected again with the aid of the inertia less method of later or earlier retrieval of the pattern information.

The first step is to determine the two correction signals. To calculate the incorrect position of the actual stencil, an attempt can be made to determine the arc length of the real stencil shown in FIG. 3, and to represent it in analytical form, by using equation (4). It is known to hold for the arc length in polar coordinates that $$b = \int_{\phi_0}^{\phi_1} \sqrt{r^2 - \left(\frac{dr}{d\phi}\right)^2} \, d\phi = \qquad (13)$$

$$\int_{\phi_0}^{\phi_1} r \cdot \sqrt{1 + \frac{1}{r^2}\left(\frac{dr}{d\phi}\right)^2} \, d\phi \equiv$$

$$\int_{\phi_0}^{\phi_1} \left(r + \frac{1}{2 \cdot r}\left(\frac{dr}{d\phi}\right)^2\right) d\phi$$

Here, $$\frac{dr}{d\phi}$$

corresponds to the differentiation of equation (4) with respect to $\phi$, and because of the generally small errors it was assumed that $$\frac{1}{r^2}\left(\frac{dr}{d\phi}\right)^2 \ll 1.$$

It follows for $$\frac{dr}{d\phi}$$

from equation (4) that $$\frac{dr}{d\phi} = -\sum_{i=1}^{N_{um}/2} c_i \cdot i \cdot \sin(i \cdot \phi + \epsilon_i) \qquad (14)$$

Substituting this into equation (13) leads to complicated expressions for the arc length b even in the case of a short Fourier series, and thus requires the determination of an analytical relationship for the pattern displacement, and its numerical evaluation certainly requires a very high outlay on computation to be applied.

A different mode of procedure is better. The value of $s_{sens}(k)$ is measured in the case of each received encoder pulse. This value is used to form $\Delta s_{sens}(k) = s_0 - s_{sens}(k)$, as already described above, and these values are stored. The length of the segment of the stencil circumference situation between these measuring points can then be calculated from two successive measured values $\Delta s_{sens}(k)$ and $\Delta s_{sens}(k+1)$ as $$db(k) = \sqrt{(\Delta s_{sens}(k) - \Delta s_{sens}(k+1))^2 + \left(R_0 + \frac{\Delta s_{sens}(k) + \Delta s_{sens}(k+1)}{2}\right)^2 \cdot \left(\frac{2 \cdot \pi}{N_{um}}\right)^2} \quad (15)$$

Summing these sublengths from the measuring point marked by the zero mark signal up to the k-th measuring point yields $$Umf_{act}(k) = \sum_{i=1}^{k} db(i) \quad (16)$$

The desired circumference of the ideal comparison stencil up to the same k-th measuring point is yielded as $$Umf_{des}(k) = 2 \cdot \pi \cdot \frac{k}{N_{um}} \cdot R_0 \quad (17)$$

The difference between these two values should correspond to the displacement error in the pattern in the circumferential direction. Since, however, there are always influences which cause substantial circumferential differences, for example thermally conditioned changes in position of the sensor or a slightly larger stencil diameter or the polygonal effect conditioned by the division of the stencil circumference into $N_{um}$ measuring points, it is expedient to determine, after each complete rotation of the stencil, a correction factor which is available during the following rotation for the correction of the subtraction. The correction factor is determined from $$K_{corr} = \frac{Umf_{des}(N_{Um})}{Umf_{act}(N_{Um})} \quad (18)$$

and is used for calculating the displacement error in the circumferential direction as follows:

$$\Delta t_{sens}(k) = Umf_{des}(k) - K_{corr} Umf_{act}(k) \quad (19)$$

The two value sequences $\Delta s_{sens}(k)$ and $\Delta t_{sens}(k)$ for each of the incoming pulses (from 0 to $N_{um}$) are now stored and the correction values are formed as follows, using the symbolic notation already employed in equations (8) and (9).

$$\Delta s_{opt}(k+N_k) = \Delta s_{sens}(k) \quad (20)$$

$$\Delta t_{opt}(k+N_T) = \Delta t_{sens}(k) \quad (21)$$

The rules to be applied here for avoiding engraving errors are thus

In the case of the k-th incoming encoder pulse form the value $\Delta s_{sens}(k) = s_0 - s_{sens}(k)$, and store the latter at the memory location of the value sequence $\Delta s_{sens}$ with the address k. In the case of the $<k+N_r>$ -the pulse, clear the value from the memory location k and impress this value on the optical system as a radial actuator travel.

In the case of k-th incoming encoder pulse, form the value $\Delta t_{sens}(k)$ in accordance with the relationship in equation (19), and stored that at the memory location of the value sequence $\Delta t_{sens}$ with the address k. In the case of the $<k+N_T>$ -the pulse, clear the value from the memory location k and either impress this value on the optical system as a tangential actuator travel or use the relationship in equation (10) to calculate an integral value by which the address of the memory location of the pattern information is to be increased if the value $s_0 - \Delta s_{sens}(k-N_{um}/4)$ is smaller than $s_0$, but if this value is greater than $s_0$ the address of the memory location of the pattern information is to be diminished by the value calculated from the relationship in equation (10).

Measuring and processing the radial eccentricity in the case of an unpressurized stencil which is excited by external forces to vibration of the thin hollow cylinder envelope.

The last case to be considered is a stencil to which a pressure is not applied on its inside, and which is excited to vibration by temporarily varying external forces. In this case, a first ranging sensor (still further sensors have to be introduced later) measures a distance for the time-dependent changes on which two different causes are decisive. The first cause is the static radial eccentricity. This is present as a function of $\chi$ over the circumference of the stencil and is defined by equation (4). The angle $\chi$ is measured starting from a zero mark provided on the stencil circumference, specifically in a polar coordinate system which is permanently connected to the stencil and whose origin lies on the stencil axis. This angle is to be counted positively in that direction which opposes the direction of rotation. Since the stencil rotates at the angular velocity $\omega$, the static radial eccentricities move past the sensor at the circumferential speed $R \cdot \omega$. Furthermore, an angular position $\phi$ of the stencil is to be defined with respect to the position of the first sensor, specifically most effectively by measuring this angle between the zero mark and the first sensor.

It then holds for $\phi$ $$\phi = \omega \cdot t \quad (22)$$

This relationship also defines the instant $t=0$. The latter is determined owing to the fact that the zero mark moves precisely past the position of the first sensor. The distance changes previously described are superimposed by distance variations which are to be ascribed to the vibration of the stencil, and this is the second cause for the time-variable distances measured by the sensor. The time dependency of this second component of the distance change is also the reason which prompts including the time t in the considerations here.

In order not to complicate the relationships excessively, it is to be assumed that the thin stencil vibrates at only one frequency. Moreover, the maximum value of the amplitude of vibration is to remain constant during the observation period. This case will be the most important case in practice, because it is to be assumed that the excitation of vibration is caused by the rotary movement of the stencil and that the vibration frequency therefore corresponds to the rotational speed or a multiple thereof. The ever present material damping effects a stationary vibration state after a short settling time. It is therefore necessary to add a further vibration component to the distance changes on the basis of the static radial eccentricities (relationships set forth in equations (4), (5)). It then holds for the radial eccentricity measured by a first sensor that:

$$s_{sens\text{-}1}(\phi) = A - R_0 - \sum_{i=1}^{N_{um}/2} |a_i \cdot \cos(i \cdot \phi) + b_i \cdot \sin(i \cdot \phi)| + \quad (23)$$

$$c_{dyn} \cdot \sin(n \cdot \phi + \Phi) \cdot \cos(\kappa \cdot t + \theta)$$

The term $$c_{dyn} \cdot \sin(n \cdot \phi + \Phi) \cdot \cos(\kappa \cdot t + \theta) \quad (24)$$

added to the relationship of equation (5) consists, as is known in the case of vibrating continual, of three factors, specifically an amplitude $c_{dyn}$ of the position function sin $(n \cdot \phi + \Phi)$ and the time-dependent function cos $(\kappa \cdot t + \theta)$. Here, $c_{dyn}$ signifies the maximum amplitude of vibration of the stencil, i.e., the amplitude at the points of the antinodes. The number of the antinodes along the circumference of the stencil, sometimes also designated as the order of the vibration, is n. The unknown angular distance between the nearest node on the stencil and the zero mark is $\theta$. The unknown time interval $T_0$ of the last maximum amplitude of the vibration from the instant t=0 coverted into a phase angle is $\theta$, and it holds that $\theta = T_0 \cdot \kappa$. Finally, $\kappa$ signifies the angular frequency of the vibration.

It is expedient for understanding the additive term set forth in equation (24) to adopt an observation standpoint fixed in the sensor and to regard the vibration picture of the stencil (that is to say, its antinodes and nodes) in its circumferential position as if it were permanently connected to the remaining form errors of the stencil. However, in contrast to the static form errors, whose size is constant with time, the antinodes pulsate in time with the vibration frequency and at the same time this pulsating feature moves past the sensor.

Yet a further remark on the order n of the vibration. This order n refers to the number of antinodes on the circumference of the stencil; the antinodes in the axial direction are of no interest here. The order n=1 signifies that only a single antinode occurs on the circumference and rotates with the stencil. This corresponds to a flexural vibration of the stencil, such as can be observed, for example, in the vicinity of a critical speed. It is known from mechanics that the antinode rotates with the rotation of the shaft in the case of flexural vibration, as well. For n=2, the stencil vibrates in such a way that an oval is formed as vibrational form, and for n=3 the vibrational form is a triangle. If the stencil vibrates at n=2 as an oval, an observer rotating with the stencil system would see a ring which has the larger diameter now in one direction and, in the next half period, in the direction perpendicular thereto. Of course, a ranging sensor measures only a variable distance to this rotating and simultaneously vibrating feature.

Generally, the stencil must not have maximum deflection precisely when the antinode passes by the sensor. For this reason, it may be expected that it is not possible using a single sensor to detect the vibration state of the stencil, and certainly not possible to separate said state from the form errors. The same conclusion can also be reached by considering the relationship in equation (23). Although after a measurement of a complete stencil circumference there are $N_{um}$ measured values available, it is necessary to use these to determine the $N_{um}$ coefficients $a_i$ and $b_i$ (i=0, 1, . . . , $N_{um}/2$) of the Fourier series terms in equation (23). There are then no more conditional equations remaining to determine the unknown parameters of the dynamic term of equation (24) will stop.

Figure 3:
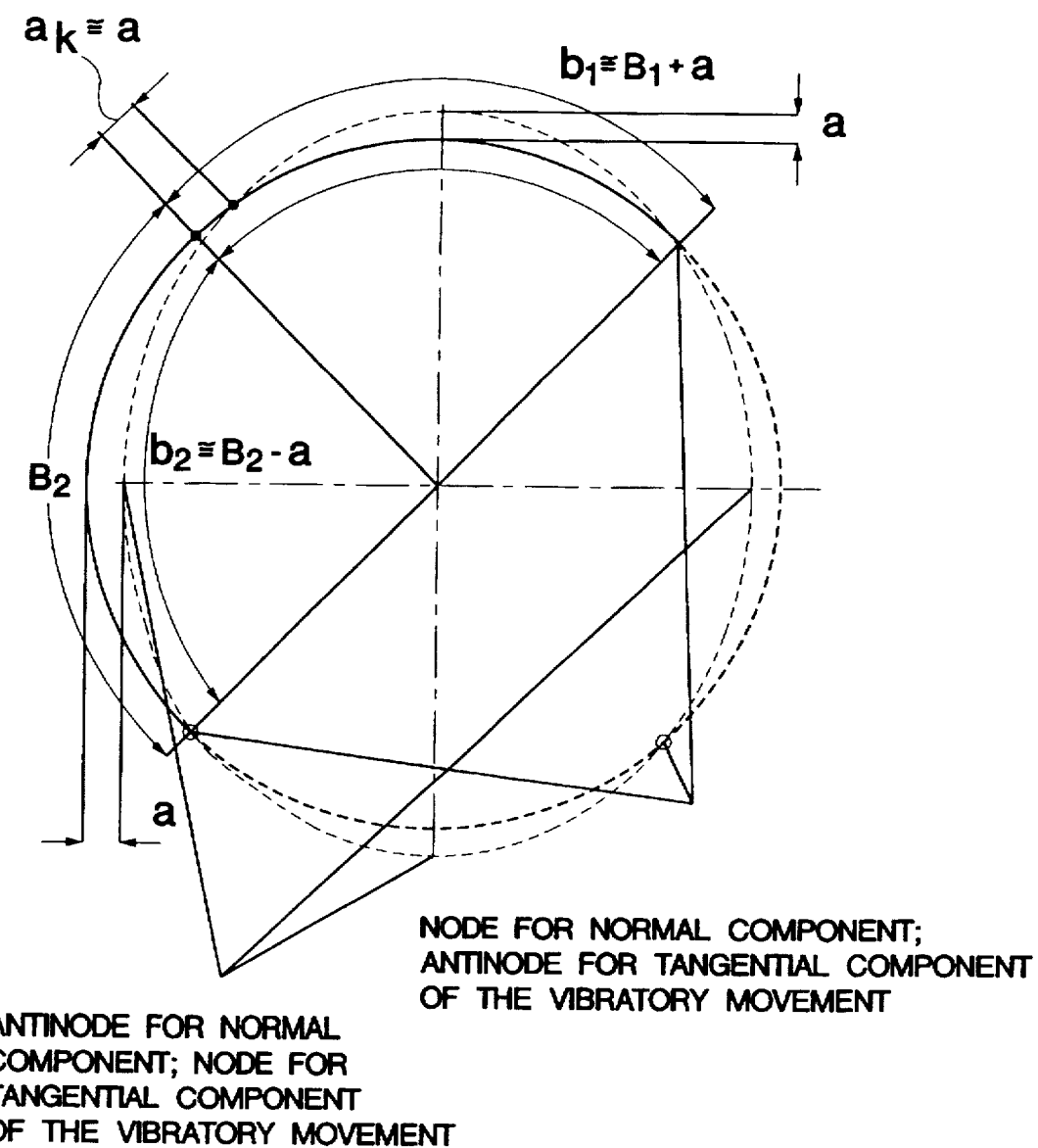
FIG. 3 illustrates membrane vibrations and amplitudes of vibration in the case of a circular cylindrical screen printing stencil.

The aim is therefore to arrange a second sensor at an angle $\alpha$ to the first sensor, which detects the distances from the stencil wall in accordance with the relationship in equation (23). An observer B2 positioned on this sensor would see the same vibrating stencil, i.e., the errors thereof, antinodes and nodes as an observer B1 on the first sensor as shown in FIG. 3. It is now to be assumed that at an arbitrary instant t during a rotation the observer B1 makes a recording of the instantaneous state of the stencil and records the angular distances from the antinodes and the prominent errors. If the observer B2 were likewise to measure the instantaneous state of the stencil at the same instant, he would establish the same amplitudes of the antinodes, but different relative angular positions to his position. Specifically, the latter differ by the angle $\alpha$ from the instantaneous recording of the observer B1. However, if the observer B2 waits for that time interval $\Delta t = \alpha/\omega$ which the stencil requires in order to rotate precisely by the angle $\alpha$, the observer B2 sees the same relative instantaneous positions of the prominent stencil errors, the antinodes and nodes, but different instantaneous values of the amplitudes of vibration. The latter are yielded corresponding to the relationship in equation (24) at the later instant $$t + \Delta t = t + \alpha/\omega \text{ as } c_{dyn} \cdot \sin(n \cdot \phi + \Phi) \cdot \cos(\kappa \cdot (t + \alpha/\omega) - \theta) \quad (26)$$

The relationship in equation (23) held for the distance of the first sensor from the stencil wall at the instant t, and the relationship $$s_{sens\text{-}2}(\phi) = A - R_0 - \sum_{i=1}^{N_{um}/2} |a_i \cdot \cos(i \cdot \phi) + b_i \cdot \sin(i \cdot \phi)| + \quad (27)$$

$$c_{dyn} \cdot \sin(n \cdot \phi + \Phi) \cdot \cos(\kappa \cdot (t + \alpha/\omega) + \theta)$$

holds correspondingly for the distance of the second sensor from the stencil wall in a completely analogous way, but at the later instant $t + \alpha/\omega$ and where $s_0 = A - R_0$.

In equation (27), $\phi$ once again denotes the same angle of rotation of the stencil as in equation (23). The relationships in equations (23) and (27) are used to elaborate those equations which are required in order to consider whether it is already possible with the aid of the measurement results of the two sensors to forecast accurately the distances of the stencil wall from an arbitrary observer or component, for example the optical system. This observer is to be permanently connected to a sensor system, but to adopt an arbitrarily prescribed angle to this system at the periphery of the rotating stencil.

The relationships in equations (23) and (27) are written down once again, but with the aid of a suitable notation the lefthand side is more effectively stressed, so that we are dealing with two different distances which are measured by two different sensors at two different instants.

$$\Delta s_{sens\text{-}1}(t) = a_0 + \sum_{i=1}^{N_{um}/2} |a_i \cdot \cos(i \cdot \phi) + b_i \cdot \sin(i \cdot \phi)| + \quad (23a)$$

$$c_{dyn} \cdot \sin(n \cdot \phi + \Phi) \cdot \cos(\kappa \cdot t + \theta)$$

$$\Delta s_{sens\text{-}2}(t + \Delta t) = a_0 + \sum_{i=1}^{N_{um}/2} |a_i \cdot \cos(i \cdot \phi) + b_i \cdot \sin(i \cdot \phi)| + \quad (27a)$$

$$c_{dyn} \cdot \sin(n \cdot \phi + \Phi) \cdot \cos(\kappa \cdot (t + \alpha/\omega) + \theta)$$

If the difference between these measurement results is now formed, and the angular coordinate $\phi$ is introduced in accordance with equation (22) instead of time ($t = \phi/\omega$), the static error components are eliminated by subtraction, and the following is obtained for the difference signal $$D_{21} = \Delta s_{sens.1}(t) - \Delta s_{sens.2}(t + \Delta t) = \tag{28}$$

$$= c_{dyn} \cdot \sin(n \cdot \phi + \Phi) \cdot \left[ \cos\left(\phi \cdot \frac{\kappa}{\omega} + \theta\right) - \cos\left(\phi \frac{\kappa}{\omega} + \alpha \cdot \frac{\kappa}{\omega} + \theta\right) \right]$$

An attempt must now be made to determine the parameters of this relationship which characterizes the dynamic error component. In order to display more effectively the physical import of the relationship in equation (28), two auxiliary variables $\epsilon$ and $\eta$ are formed for which $$\cos(\epsilon) = \eta \cdot \left[ 1 - \cos\left(\frac{\kappa}{\omega} \cdot \alpha\right) \right] \tag{29a}$$

and $$\sin(\epsilon) = \eta \cdot \sin\left(\frac{\kappa}{\omega} \cdot \alpha\right) \tag{29b}$$

It then follows from equation (28) that $$D_{21} = \frac{c_{dyn} \cdot \eta}{2} \cdot \left\{ \sin\left[\left(n - \frac{\kappa}{\omega}\right) \cdot \phi + \Phi - (\theta - \epsilon)\right] + \sin\left[\left(n + \frac{\kappa}{\omega}\right) \phi + \Phi + (\theta - \epsilon)\right] \right\} \tag{30}$$

and it is to be seen from this form of the difference between the two sensor signals that the difference is composed of two sine signals having an amplitude of the same size but being of different frequencies, i.e., a beat response. The unknown parameters in the relationship (30) and, of course, also in equation (28) are the variables $c_{dyn}$, $\kappa$, $\omega$, $\theta$, $n$ and $\Phi$. The auxiliary variables $\epsilon$ and $\eta$, by contrast, can be ascribed to $\theta$, $\omega$ and the known angular distance $\alpha$ between the first and second sensors. It holds that $$\epsilon = \arctan\left( \frac{\sin\left(\frac{\kappa}{\omega} \cdot \alpha\right)}{1 - \cos\left(\frac{\kappa}{\omega} \cdot \alpha\right)} \right) \tag{31a}$$

and $$\eta = \frac{1}{\sqrt{2 \cdot \left[1 - \cos\left(\frac{\kappa}{\omega} \cdot \alpha\right)\right]}} \tag{31b}$$

it is also possible to find a direct functional relationship for equations (31a) and (31b) by eliminating parameter $$\frac{\kappa}{\omega} \cdot \alpha$$

Recourse will be made to this later.

$$\eta = \frac{1}{2 \cdot \cos(\epsilon)} \tag{31c}$$

$$\epsilon = \arccos\left(\frac{1}{2 \cdot \eta}\right) \tag{31d}$$

The special form of the difference signal described by equation (30) suggests it is expedient to express this equation in a form which permits simple comparison with a Fourier series. For this purpose, $$D_{21} = \frac{c_{dyn} \cdot \eta}{2} \cdot \left\{ \sin\left[\left(n - \frac{\kappa}{\omega}\right) \cdot \phi\right] \cdot \cos[\Phi - (\theta - \epsilon)] + \cos\left[\left(n - \frac{\kappa}{\omega}\right) \cdot \phi\right] \cdot \sin[\Phi - (\theta - \epsilon)] \right\} + \frac{c_{dyn} \cdot \eta}{2} \cdot \left\{ \sin\left[\left(n + \frac{\kappa}{\omega}\right) \cdot \phi\right] \cdot \cos[\Phi + (\theta - \epsilon)] + \cos\left[\left(n + \frac{\kappa}{\omega}\right) \cdot \phi\right] \cdot \sin[\Phi + (\theta - \epsilon)] \right\} \tag{32}$$

is formed, $$a_{low} = \frac{c_{dyn} \cdot \eta}{2} \cdot \sin[\Phi - (\theta - \epsilon)] \; b_{low} = \frac{c_{dyn} \cdot \eta}{2} \cdot \cos[\Phi - (\theta - \epsilon)] \tag{33}$$

$$a_{high} = \frac{c_{dyn} \cdot \eta}{2} \cdot \sin[\Phi + (\theta - \epsilon)] \; b_{high} = \frac{c_{dyn} \cdot \eta}{2} \cdot \cos[\Phi + (\theta - \epsilon)]$$

is substituted therein, and $$D_{21} = a_{low} \cos\left[\left(n - \frac{\kappa}{\omega}\right) \cdot \phi\right] + b_{low} \cdot \sin\left[\left(n - \frac{\kappa}{\omega}\right) \cdot \phi\right] + a_{high} \cdot \cos\left[\left(n + \frac{\kappa}{\omega}\right) \cdot \phi\right] + b_{high} \cdot \sin\left[\left(n + \frac{\kappa}{\omega}\right) \cdot \phi\right] \tag{34}$$

is obtained in the desired Fourier form. It is seen that only two terms of this series stand out. The first term is that of order $n - \kappa/\omega$. This can be of zeroth order if $n - \kappa/\omega = 0$. The quotient $\kappa/\omega$ is formed from (the angular frequency $\kappa$ of the membrane vibration and from the angular velocity ($\omega$) of the stencil. Since the vibration is excited by the rotary movement of the stencil, only integer ratios $\kappa/\omega$ occur, and the orders $n - \kappa/\omega$ and $n + \kappa/\omega$ then likewise remain integers.

If the values of the coefficients $a_{low}$, $b_{low}$, $a_{high}$ and $b_{high}$ were known in conjunction with the parameters $n$, $\kappa$ and $\omega$ in equation (32), it would be possible to determine the value of the difference signal $D_{21}$ for each arbitrary angle $\phi$. Although, unfortunately, coefficients and parameters are not known, the value $D_{21} = \Delta s_{sens.1} - \Delta s_{sens.2}$ stored in each case for one rotation are available. These can be used to recalculate the coefficients $a_{low}, \ldots, b_{high}$, for example using the known method of fast Fourier transformation (FFT). Once the coefficients have been determined, four equations (31a–31d) are available for the purpose of calculating further unknowns of the six parameters $c_{dyn}$, $\epsilon$, $\eta$, $\Phi$, $n$ and $\theta$. Apart from the coefficients mentioned, in the case of FFT, the orders of these coefficients also occur, that is to say $$O_1 = n - \kappa/\omega \tag{34a}$$

$$O_2 = n + \kappa/\omega \tag{34b}$$

because the coefficients of all other orders vanish.

The value of $\Phi$ can be determined very simply:

$$a_{low} = \frac{c_{dyn} \cdot \eta}{2} \cdot |\sin(\Phi) \cdot \cos(\theta - \epsilon) - \sin(\theta - \epsilon) \cdot \cos(\Phi)|$$

$$a_{high} = \frac{c_{dyn} \cdot \eta}{2} \cdot |\sin(\Phi) \cdot \cos(\theta - \epsilon) + \sin(\theta - \epsilon) \cdot \cos(\Phi)|$$

Adding these two expressions $$a_{low} + a_{high} = c_{dyn} \cdot \eta \cdot \sin(\Phi) \cdot \cos(\theta - \epsilon); \tag{35}$$

is obtained; it follows analogously that:

$$b_{low} + b_{high} = c_{dyn} \cdot \eta \cdot \cos(\Phi \cdot \cos(\theta - \epsilon); \quad (36)$$

and, finally, from equations (33) and (34) that $$\Phi = \arctan\left(\frac{a_{low} + a_{high}}{b_{low} + b_{high}}\right) \quad (37)$$

It may be shown, furthermore, that $$\theta - \epsilon = \frac{1}{2} \cdot \left[\arctan\left(\frac{a_{high}}{b_{high}}\right) - \arctan\left(\frac{a_{low}}{b_{low}}\right)\right] \quad (38)$$

holds for the difference $\theta - \epsilon$

The value $\alpha \cdot \kappa/\omega$ can be eliminated from equations (29a) and (29b) and the following is obtained for $\epsilon$ as a function of $\eta$:

$$\epsilon = \arccos\left(\frac{1}{2 \cdot \eta}\right) \quad (39)$$

Finally, it can be shown with the aid of equation (32) that $$\frac{c_{dyn}^2 \cdot \eta^2}{4} = a_{low}^2 + b_{low}^2 = a_{high}^2 + b_{high}^2 \quad (40)$$

must hold.

The expressions (38), (39) and (40) represent three equations for determining the four unknowns $\theta$, $\epsilon$, $\eta$ and $c_{dyn}$. The system of equations is therefore not sufficiently determined and no solution is yet possible. This could already have been realized from equation (34), because this system of equations was already underdetermined and, in addition, the variables $\Phi$ and $\epsilon$ and likewise the variables $c_{dyn}$ and $\eta$ always occurred in the same combination in equation (34).

A solution of the present problem therefore requires the mounting of a third ranging sensor which is offset relative to the first ranging sensor by the installation angle $\beta$, there being a requirement that $\beta \neq \alpha$. Only with the measured values additionally supplied by this third sensor does it become possible to determine all the variables required to determine the stencil vibration, and in this way to separate the radial eccentricities as a consequence of vibration from the static radial eccentricities. This is necessary because the calculation of the radial and tangential positional errors at the location of the laser beam can only be performed separately for the static eccentricity and the vibrational deviation.

However, a transformation of equation (40) is required as a first step. From equation (40) it follows, if $\eta$ is replaced by its equivalent from equation (31b) and it is considered that $1-\cos(x) = 2 \cdot \sin^2(x/2)$, that $$a_{low}^2 + b_{low}^2 = a_{high}^2 + b_{high}^2 = \frac{c_{dyn}^2 \cdot \eta^2}{4} = \quad (41)$$

$$\frac{c_{dyn}^2}{4} \cdot \frac{1}{2 \cdot \left[1 - \cos\left(\frac{\kappa}{\omega} \cdot \alpha\right)\right]} =$$

$$\frac{c_{dyn}^2}{16 \cdot \sin^2\left(\frac{1}{2} \cdot \frac{\kappa}{\omega} \cdot \alpha\right)}$$

In a manner entirely similar to how it was demonstrated previously for the difference signal of the second and first sensor, the result for the difference signal between the third and first sensor is obtained, instead of equation (34), as $$D_{31} = \Delta s_{sens,1}(t) - \Delta s_{sens,3}(t + \Delta t) = \quad (42)$$

$$\overline{a}_{low} \cdot \cos\left[\left(n - \frac{\kappa}{\omega}\right) \cdot \phi\right] + \overline{b}_{low} \cdot \sin\left[\left(n - \frac{\kappa}{\omega}\right) \cdot \phi\right] +$$

$$+ \overline{a}_{high} \cdot \cos\left[\left(n + \frac{\kappa}{\omega}\right) \cdot \phi\right] + \overline{b}_{high} \cdot \sin\left[\left(n + \frac{\kappa}{\omega}\right) \cdot \phi\right]$$

Values $\overline{a}_{low}$, $\overline{b}_{low}$, $\overline{a}_{high}$ and $\overline{b}_{high}$ are calculated, in a similar way as already done earlier for the coefficients $a_{low}$, $b_{low}$, $a_{high}$ and $b_{high}$, with the aid of an FFT of the value sequence, determined by measurement, for $D_{31}$. It holds for these values by analogy with equation (39) that:

$$\overline{a}_{low}^2 + \overline{b}_{low}^2 = \overline{a}_{high}^2 + \overline{b}_{high}^2 = \frac{c_{dyn}^2 \cdot \eta^2}{4} = \quad (43)$$

$$\frac{c_{dyn}^2}{4} \cdot \frac{1}{2 \cdot \left[1 - \cos\left(\frac{\kappa}{\omega} \cdot \beta\right)\right]} =$$

$$\frac{c_{dyn}^2}{16 \cdot \sin^2\left(\frac{1}{2} \cdot \frac{\kappa}{\omega} \cdot \beta\right)}$$

It may be recalled that $c_{dyn}$ is the maximum amplitude of vibration of the stencil at its circumferential antinodes. The amplitude therefore does not depend on the position of a sensor. If $\beta = 2\alpha$ is now further chosen, it follows from equations (41) and (43) that:

$$\frac{\sin^2\left(\frac{1}{2} \cdot \frac{\kappa}{\omega} \cdot 2 \cdot \alpha\right)}{\sin^2\left(\frac{1}{2} \cdot \frac{\kappa}{\omega} \cdot \alpha\right)} = \frac{a_{low}^2 + b_{low}^2}{\overline{a}_{low}^2 + \overline{b}_{low}^2}$$

and, further, that $$\frac{\sin\left(\frac{1}{2} \cdot \frac{\kappa}{\omega} \cdot 2 \cdot \alpha\right)}{\sin\left(\frac{1}{2} \cdot \frac{\kappa}{\omega} \cdot \alpha\right)} =$$

$$\frac{2 \cdot \sin\left(\frac{1}{2} \cdot \frac{\kappa}{\omega} \cdot \alpha\right) \cdot \cos\left(\frac{1}{2} \cdot \frac{\kappa}{\omega} \cdot \alpha\right)}{\sin\left(\frac{1}{2} \cdot \frac{\kappa}{\omega} \cdot \alpha\right)} =$$

$$2 \cdot \cos\left(\frac{1}{2} \cdot \frac{\kappa}{\omega} \cdot \alpha\right) = \sqrt{\frac{a_{low}^2 + b_{low}^2}{\overline{a}_{low}^2 + \overline{b}_{low}^2}}$$

and finally $$\frac{\kappa}{\omega} = 2 \cdot \arccos\left(\frac{1}{2} \cdot \sqrt{\frac{a_{low}^2 + b_{low}^2}{\overline{a}_{low}^2 + \overline{b}_{low}^2}}\right) / \alpha \quad (44)$$

is obtained.

This relationship (44) is the key to the further evaluations, and now finally permits the determination of $\kappa/\omega$. If this value is known, it is possible to draw conclusions on variable $\epsilon$ by means of equation (31a), and on the value of $\eta$ by means of equation (31b). The variable $\Phi$ follows from equation (38) with a known $\epsilon$ and, finally, the value of $c_{dyn}$ follows from equation (40) with a known $\eta$. It is also possible to determine the number of the antinodes n, where n is the order of the vibration, from equations (34a) or (34b).

All the parameters which were placed as unknown in the vibration component of the relationship equation (23) are now determined.

The values $s_{sens.1}(\phi)$ measured by the first sensor during a rotation can therefore be freed from their vibration component (24). The correct determination of $\phi$ and t is to be borne in mind here. In the position function $\sin(n \cdot \phi + \Phi)$ of the vibration component (24), $\phi$ denotes the angle between the zero mark and the first sensor at the measuring instant t. The result for the distance from the stencil wall to the sensor which is freed from the dynamic component is $$s_{sens.1static}(\phi) = s_{sens.1}(\phi) - \tag{45}$$

$$c_{dyn} \cdot \sin(n \cdot \phi + \Phi) \cdot \cos\left(\frac{\kappa}{\omega} \cdot \phi + \theta\right) =$$

$$A - R_0 - \sum_{i=1}^{N_{um}/2} |a_i \cdot \cos(i \cdot \phi) + b_i \cdot \sin(i \cdot \phi)|$$

Consequently, it follows for the static part of the difference of the measured distances from the sensor to the ideal stencil and from the sensor to the real stencil $\Delta s_{sens.1.static} = s_o - s_{sens.1.static}(\phi)$, where $s_0 = A - R_0$, thus that $$\Delta s_{sens.1.static}(\phi) = s_0 - s_{sens.1}(\phi) + \tag{47}$$

$$c_{dyn} \cdot \sin(n \cdot \phi + \Phi) \cdot \cos\left(\frac{\kappa}{\omega} \cdot \phi + \theta\right)$$

The further calculation can be better surveyed if $\phi$ in equation (47) is replaced by the number of the encoder pulses which are counted starting with the zero pulse. It then follows that $$\Delta s_{sens.1.static}(k) = s_o - s_{sens.1}(k) + \tag{48}$$

$$c_{dyn} \cdot \sin\left(n \cdot \frac{k}{N_{um}} \cdot 2 \cdot \pi + \Phi\right) \cdot \cos\left(\frac{\kappa}{\omega} \cdot \frac{k}{N_{um}} \cdot 2 \cdot \pi + \theta\right)$$

and this value $\Delta_{sens.1.static}$ is stored at the memory location k of its measured value sequence. If the stencil position measured by the sensor is located below the optical system—a further $N_{um} \cdot r/(2 \cdot \pi) = N_r$ pulses have then elapsed—this value is cleared, corrected by the vibration component then valid, and finally, impressed on the optical system as a radial manipulated variable. This state of affairs is described as follows with the aid of the symbolic system already used earlier $$\Delta s_{opt}(\kappa + N_r) = \Delta s_{sens.1.static}(k) - \tag{49}$$

$$c_{dyn} \cdot \sin\left(n \cdot \frac{k}{N_{um}} \cdot 2 \cdot \pi + \Phi\right) \cdot \cos\left(\frac{\kappa}{\omega} \cdot \frac{k + N_r}{N_{um}} \cdot 2 \cdot \pi + \theta\right)$$

It is important for the purpose of calculating the pattern displacement in the circumferential direction to know whether there is an envelope generated which nowhere experiences a displacement in the circumferential direction. FIG. 3 shows a circular cylindrical stencil which vibrates in the form of an oval. Given small amplitudes of vibration, the amplitudes are equal in both directions leading out of the equilibrium position in the case of all vibrating bodies.

It then follows from a simple geometrical estimation of the arc lengths between the nodes that firstly, the node must experience a deflection in the circumferential direction which is equal to the deflection of the antinodes in the direction normal to the membrane surface, and that secondly, for reasons of symmetry, the displacement of the antinodes of the membrane vanishes in the circumferential direction.

An envelope generated by the stencil through an antinode (parallel to the axis) thus exhibits the desired response. Because of the random nature of the selection of the zero mark, it is not possible to expect this response of the envelope generated at this point. It would be possible, after all, for the zero mark to be situated precisely at the point of an antinode.

The calculation of the displacement is therefore to proceed from such an antinode. An antinode adjacent to the zero mark must be situated where the position function $\sin(2 \cdot n \cdot k \cdot \pi/N_{um} + \Phi)$ in equation (23) assumes the value 1. It follows that $$n \cdot \frac{k_B}{N_{um}} \cdot 2 \cdot \pi + \Phi = \frac{\pi}{2} \tag{50}$$

and the pulse number $k_B$=(pulse number from the zero mark up to the first antinode position) corresponding to the antinode position thus becomes $$k_B = \left(\frac{\pi}{2} - \Phi\right) \frac{N_{um}}{2 \cdot n \cdot \pi} \tag{51}$$

Figure 4:
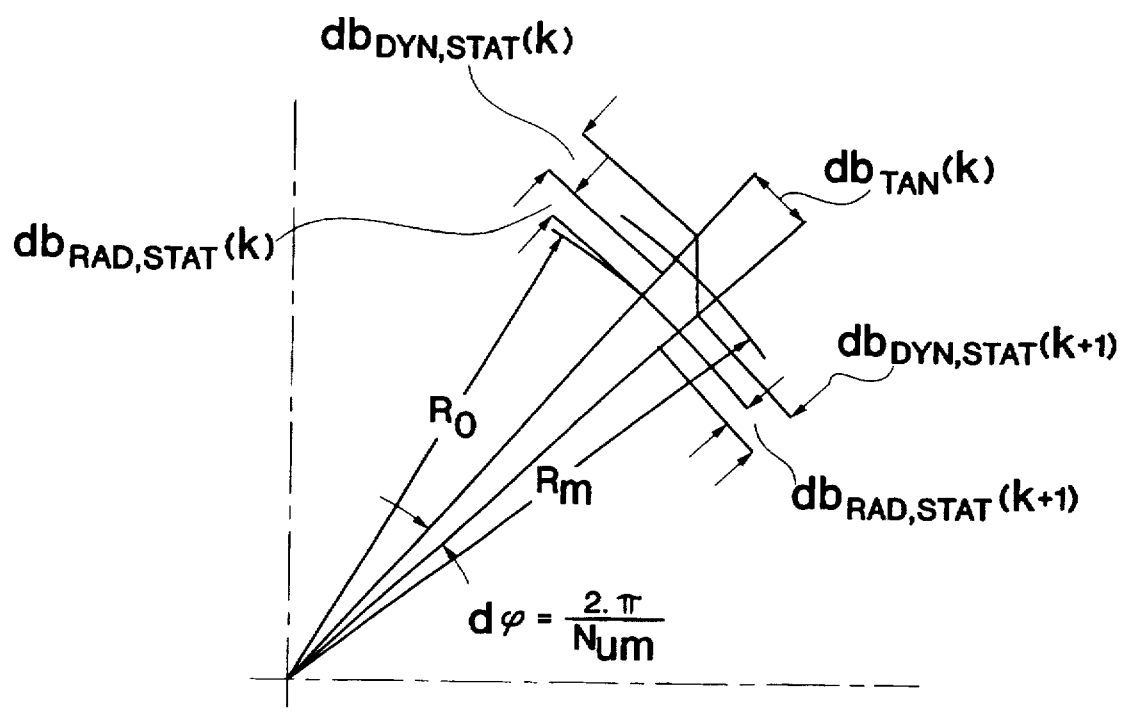
FIG. 4 illustrates sublengths of the screen printing stencil.

The next calculation step consists in determining the circumferential sublengths db(k) of the stencil between in each case two measuring points, and to sum these, starting from the position of the antinode, up to the engraving point, in order to obtain the arc length of this partial circumference of the stencil. It is then necessary to use the partial circumference to form the distance relative to the corresponding partial circumference of the ideal stencil. This is the displacement of the stencil wall in the circumferential direction. The sublengths db(k) are to be geometrically composed, as already earlier, from radial and tangential segments. The radial segments consist here of a static and a dynamic error component. The result for the static error component of the radial segment, as shown in FIG. 4, is $$db_{rad.stat}(k) = \Delta s_{sens.1.sens}(k) - \Delta s_{sens.1.sens}(k+1) \tag{52}$$

The dynamic error component is to be ascribed to the vibration, inserting the engraving time $t_G$ in the time function ZTF of all the segments for t.

$$ZTF = \cos(\kappa \cdot t_G + \theta) = \cos\left(\frac{\kappa}{\omega} \cdot \frac{\kappa + N_T}{N_{um}} \cdot 2 \cdot \pi + \theta\right) \tag{53}$$

$$db_{rad.dyn}(k) = c_{dyn} \cdot \left[ \sin\left(n \cdot \frac{k}{N_{um}} \cdot 2 \cdot \pi + \Phi\right) - \tag{54}$$

$$\sin\left(n \cdot \frac{k+1}{N_{um}} \cdot 2 \cdot \pi + \Phi\right)\right] \cdot ZTF \cong$$

$$-c_{dyn} \cdot n \cdot \frac{2 \cdot \pi}{N_{um}} \cdot \cos\left(n \cdot \frac{k}{N_{um}} \cdot 2 \cdot \pi + \Phi\right) \cdot ZTF$$

The following is obtained for the tangential segment $$db_{tan}(k) = \left(R_0 + \frac{\Delta s_{sens.1.static}(k) + \Delta s_{sens.1.static}(k+1)}{2}\right) \cdot \frac{2 \cdot \pi}{N_{um}} \tag{55}$$

The geometrically combined sublength becomes $$db(k) = \sqrt{|db_{tan}(k)|^2 + |db_{rad.stat}(k) + db_{rad.dyn}(k)|^2} \tag{56}$$

The summation of these sublengths is best carried out at first for a complete circumference, in order to be able to determine a correction factor $K_{corr}$ already used earlier. This is also intended here to compensate effects such as those of sensor displacement or the polygon effect. The result is $$K_{corr} = \frac{\sum_{k=k_B}^{N_{um}+k_B} db(k)}{2 \cdot \pi \cdot R_0} \tag{57}$$

It now further follows for the arc lengths of the partial circumference of the real stencil that $$Umf_{act} \cdot (k) = \sum_{i=k_B}^{i=k_B+k} db(i) \tag{58}$$

and for the arc length of the partial circumference of the ideal stencil that $$Umf_{des}(k) = 2 \cdot \pi \frac{k - k_B}{N_{um}} \cdot R_0 \tag{59}$$

Finally, it is possible from this to determine the circumferential displacement of the pattern image at the point of the k-th pulse, but at the time of the transmission of the (k+N$_r$)-th pulse at the engraving point. The result is $$\Delta t_{opt}(k+N_r) = Umf_{des}(k) - K_{corr} UMF_{act}(k) \tag{60}$$

The computational requirements for determining the corrections $\Delta s_{opt}$ and $\Delta t_{opt}$ appears complex. The complexity of the calculation is, however, of interest only for setting up the program. More importance attaches to the computational requirements for the program while running. There is a need to determine whether such requirements for a given computer performance are acceptable. It is to be pointed out here that only very slight differences are to be observed in the magnitude of the amplitude of vibration over length sections of the stencil of the order of magnitude of approximately 10 mm, and that the displacements $\Delta s_{opt}$ and $\Delta t_{opt}$, once calculated within these length sections, hold for all the series. The vibrational form, i.e., the order n of the vibration, is even preserved over the entire length of the stencil and changes only if the exciting frequency (rotational speed) changes. Assuming that the width of an engraving line amounts at most to 100 µm, the computing run described has to be carried out only once for approximately 100 rotations of the stencil, a computational outlay which can be justified.

Figure 5:
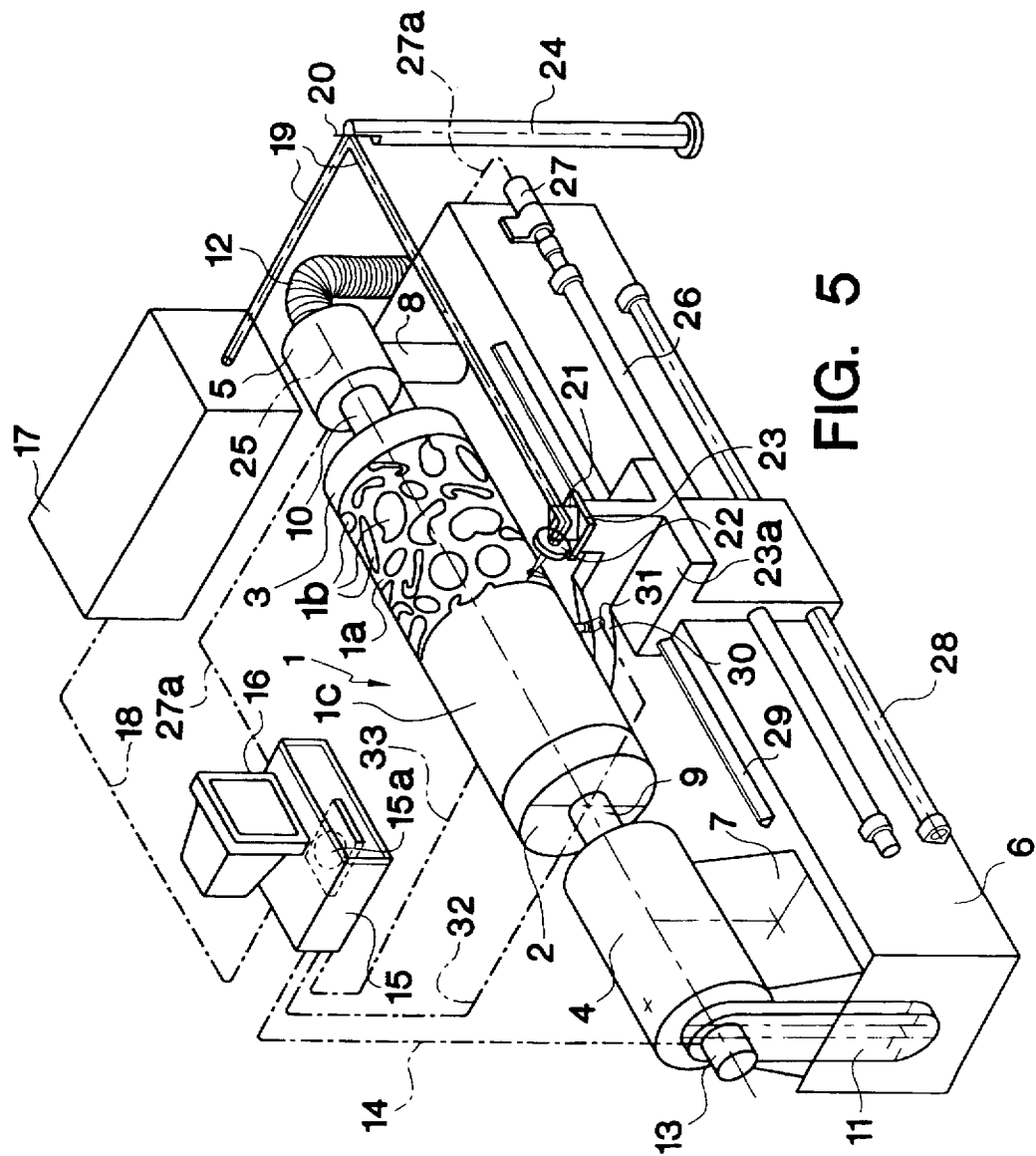
FIG. 5 shows a perspective total view of a device according to the present invention.

A device according to the invention for carrying out the method described above is shown in FIG. 5. A screen printing stencil bears the reference symbol 1, while a hollow cylinder is provided with the reference symbol 1a. Located on the follow cylinder 1a is a stencil pattern 1b, specifically inside a light responsive layer, i.e., a layer for which at least one physical characteristic is altered when light impinges upon it, preferably a lacquer layer 1c, which is situated on the outer circumferential surface of the follow cylinder 1a. In this case, the hollow cylinder 1a is, for example, a uniformly perforated nickel cylinder.

The screen printing stencil 1 is held at its mutually opposite end faces by, in each case one clamping head 2 or 3, which are constructed as centering flanges. These clamping heads 2, 3 are respectively rotatably mounted in a bearing shell 4, 5. The bearing shells 4, 5 are supported on a machine bed 6, specifically via support devices 7, 8.

The support device 8 can be removed from the machine bed 6, or can be displaced relative to the machine bed 6 in the longitudinal direction of the screen printing cylinder 1a so that the cylinder 1a can more easily be positioned between the clamping heads 2,3 or can be taken out again from the region situated between them.

A hollow shaft section 9 connected to the left-hand clamping head 2 extends into the bearing shell 4 and is rotatably mounted there. This hollow shaft section 9 is set rotating via a drive chain which runs through the support device 7 up to a drive motor which is arranged in the machine bed. When the hollow shaft section 9 rotates, it drives the clamping head 2, with the result that the screen printing stencil 1 is thereby set rotating. The other clamping head 3 rotates freely and is mounted in the bearing shell 5 via a hollow shaft section 10.

The two hollow shaft sections 9 and 10 end in the region of the clamping head 2 and 3, respectively, i.e., they do not extend into the screen printing stencil 1, and are, furthermore, connected sealingly to flow ducts 11 and 12 at their ends away from the clamping head 2, 3.

A shaft encoder 13, connected to the free end of the hollow shaft section 9, informs, via a control line 14, a computer 15 with an associated monitor 16, of the respective rotary position of the screen printing stencil 1. In this case, the computer 15 sends appropriate switch-on or switch-off pulses to a laser 17 via a control line 18. A laser beam 19 of the laser 17 is emitted or not emitted in accordance with these switch-on and switch-off pulses, respectively. A first deflecting mirror 20 directs the laser beam 19 to a second deflecting mirror 21. The second deflecting mirror 21 is mounted together with a focussing lens 22 on an optics carriage 23 which is movably arranged on an adjusting carriage 23a. As will be explained later, the adjusting carriage 23a is supported indirectly on the machine bed 6, which stands on the ground, for example, just like a post 24 for holding the first deflecting mirror 20.

In the region between the first deflecting mirror 20 and the second deflecting mirror 21, the laser beam 19 extends parallel to the cylinder axis 25 of the screen printing stencil 1 and is deflected by the second deflecting mirror 21 in such a way that it impinges at least approximately radially on the follow cylinder 1a. In this case, it is focussed onto the lacquer layer 1c by means of the focussing lens 22.

The adjusting carriage 23a can be displaced in the direction of the cylinder axis 25 of the screen printing stencil 1. This displacement is effected by a spindle 26 and a motor 27 which drives this spindle. A round guide 28 and a prismatic guide 29 ensure a movement of the adjusting carriage 23 which is exactly parallel to the cylinder axis 25 of the screen printing stencil 1. In this case, the prismatic guide 29 is located on the upper surface of the machine bed 6, while the spindle 26 and the round guide 28 are arranged parallel to one another on the front of the machine bed 6.

Located inside the machine bed 6 are gas delivery devices of which respectively one is connected to one of the flow ducts 11 and 12. A compressed gas can be blown into the interior of the screen printing stencil 1 by these gas delivery devices via the flow ducts 11, 12, the hollow shaft sections 9, 10 and the clamping heads 2, 3. A sealing means can also be blown with the gas into the interior of the screen printing cylinder 1, in order, if necessary, to seal off the inside openings, freed from the lacquer layer 1c, in the hollow cylinder 1a. The sealing means can be, for example, material chippings, for example paper shreds or small plastic discs and the like, which can also have a reflecting surface.

The motor 27 for driving the spindle 26 is preferably a stepping motor, with the result that it is also possible to determine the axial position of the laser beam 19 impinging on the hollow cylinder 1a by means of the drive pulses for the stepping motor 27. Corresponding drive pulses are received by the stepping motor 27 from the computer 15 via a line 27a.

A bow 30 is connected to the adjusting carriage 32a, for example in one piece, and comes to lie below the screen printing stencil 1 and surrounds the latter at a distance, for example in the shape of a circular arc or semicircle. The bow 30 is thus correspondingly moved in sympathy with the movement of the carriage 23$a$ in the direction of the cylinder axis 25. Attached to the bow 30, or recessed therein, are one or more ranging sensors 31 which are aligned radially relative to the screen printing stencil 1 and measure the distance between them and the surface of the screen printing stencil 1 or the hollow cylinder 1$a$, the distance-measuring signals are sent via a line 32 to the computer 15.

The bow 30 can carry, for example, three ranging sensors 31 which are situated at different circumferential positions on the screen printing stencil 1. These ranging sensors 31 are used to measure, at respectively fixed measuring positions, radial deviations in the actual position of the wall of the hollow cylinder 1$a$ from its ideal position for a multiplicity of circumferential positions of the hollow cylinder 1$a$ when the cylinder 1$a$ is rotating.

The respective measuring signals are then processed in the computer 15, in order to determine the radial positional deviations from the measured distances between the sensor and the hollow cylinder surface. The first and second actuating signals already mentioned at the beginning are obtained therefrom. The first actuating signal is used for the purpose of retrieving the pattern information sooner or later from a storage device located in the computer 15. As a result, the tangential displacements of the hollow cylinder wall can be compensated. The focus of the laser beam is held permanently in the region of the lacquer layer 1$c$ by the second actuating signal, and this can be performed by appropriate displacement of the optics carriage 23, which can be displaced relative to the adjusting carriage 23$a$ and in the radial direction of the screen printing stencil 1. The displacing signal for displacing the optics carriage 23 is fed to the latter from the computer 15 via line 33.

Unfortunately, thin-walled screen printing stencils are not ideal circular cylindrical bodies. Both along their longitudinal extent and in their cross-section, they have deviations from the ideal shape of the circular cylinder which prevent the pattern from being applied in a pattern-to-fit fashion and require that the effects of these deviations be rendered harmless, for example by measurement and the introduction of suitable correction measures.

Figure 6:
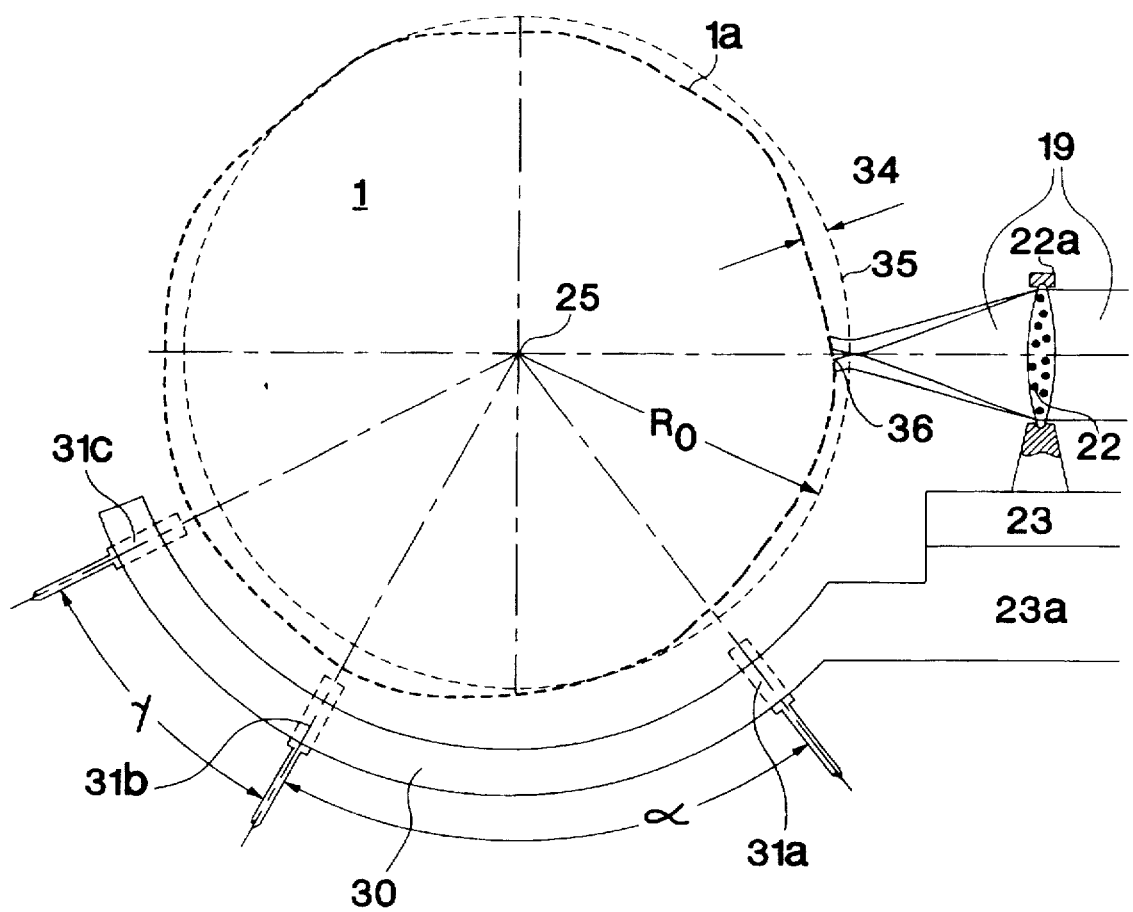
FIG. 6 shows a cross-section in the region of an optics carriage of the device according to FIG. 5.
Figure 7:
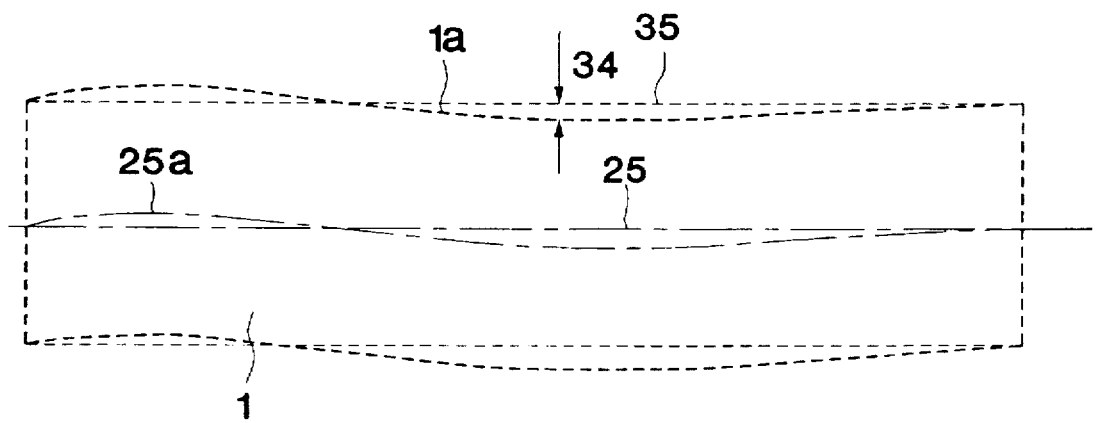
FIG. 7 shows a longitudinal section through a screen printing stencil.

FIGS. 6 and 7 show a screen printing stencil 1 of non-ideal, circular cylindrical shape. FIG. 6 shows a typical cross-sectional variation and FIG. 7 shows the deviations in the longitudinal section of the screen printing stencil 1. The radial eccentricities 34 of the screen printing stencil 1 are represented by comparison with an ideal circle 35, these eccentricities having been drawn, for reasons of clarity, somewhat larger in relation to the errors occurring in practice. Three sensors 31$a$, 31$b$, 31$c$ are provided for the purpose of measuring these radial eccentricities 34. Such sensors are known and can establish the distance changes form a reference point on the basis of inductive, capacitive or optical effects. They are all aligned on the cylinder axis 25.

As already explained at the beginning, the radial eccentricities 34 have a plurality of causes. Firstly, there are static form variations. This term refers to the deviations, already mentioned, from the accurate circular cylindrical shape which can already be observed in the case of a stencil at rest. These are to be ascribed, for example in the case of a thin-walled nickel stencil produced by electroforming, to internal material stresses which occur more or less by accident during the process of manufacturing such a stencil. It is possible in the case of these static form variations to distinguish deviations of the cross-section from the circular shape 35 and deviations of the real stencil axis 25$a$ from its ideal straight-line extent 25. In the case of a cross-section which is exactly circular, this last named form variation produces a radial eccentricity 34 as a consequence of an eccentricity of the center of the circle. In addition to the static form variations, there are ones which are dynamically conditioned, i.e., those which are caused by vibrations of the thin stencil wall.

In order to detect all these radial eccentricities, three ranging sensors 31$a$, 31$b$, 31$c$ are used, and these are, moreover, arranged with respect to each other at two different angular distances $\alpha$ and $\gamma$, where $\alpha+\gamma=\beta$. This is very advantageous for separating the signals in static and dynamic components. The sensors 31$a$, 31$b$, 31$c$ are provided in a mounting position in which they are no longer influenced by other components, i.e., ferromagnetic materials are, however, not provided in the environment of the active end of an inductive sensor. The sensors are preferably arranged in the lower cross-sectional half of the stencil 1 directly adjoining the engraving point 36. The sensors are held in the stiff bow 30, which is not susceptible to vibration and is permanently connected to the adjusting carriage 23$a$. This adjusting carriage 23$a$ carries an optics carriage 23, and the latter in turn carries the lens 22 in a lens mount 22$a$.

Not only can the radial eccentricities 34 be measured and adjusted by means of the optical system in agreement with the measured results, but also the radial eccentricities 34 can be kept small from the very first. For this purpose, air at a slight overpressure is blown into the interior of the stencil 1 starting from the end faces thereof. The effect of the membrane stresses produced in the stencil envelope is that the latter is stressed outwards in a largely circular fashion. Since the remaining radial eccentricities are rendered small to very small by this measure, it is also possible for the measuring range of the sensors 31$a$, 31$b$ or 31$c$ to be selected to be small, resulting in an even more accurate measurement result than would be the case without the application of pressure to the inside of the stencil.

In process steps following the measurement of the radial eccentricity, the measuring signals of the three sensors 31$a$, 31$b$, 31$c$ obtained during a rotation are decomposed into their components to be assigned to static and dynamic form variations. The coefficients of a first order are obtained from these components which are formed for example with the aid of FFT (Fast Fourier Transformation), and the actuating signals for the focal point are derived from these terms. Since, in accordance with experience, the vibrations of the stencil wall have small to very small amplitudes, particularly when the wall is subjected to an internal overpressure, even if only slight, the actuating signals obtained from the FFT can be used for a plurality of successive rotations of the stencil. It is also possible, as the case may be, to avoid the FFT by using RC filtering to obtain the signal component of the first order form the analog measuring signals immediately downstream of the sensors. In particular cases, this means that given effective rounding out of the stencil by a sufficiently high internal pressure, it is also possible to use the unfiltered signals instead of the signal component of the first order.

Once the actuating signals have been determined, the focus is adjusted in a different way. Firstly, the focus is adjusted in the radial direction by radial movement of the optical system, that is to say the lens 22. Then the focus is adjusted in the circumferential direction of the stencil 1. The most favorable method here is to leave the focal point always at the same physical position, but to provide the pattern signal, somewhat sooner or somewhat later via the computer, so that engraving is always carried out correctly despite the displacement of the circumferential position of the stencil. Thus, if the wall of the stencil has been somewhat advanced with respect to the desired position, the pattern signals are transmitted to the laser by the computer somewhat sooner and vice versa.

Figure 8:
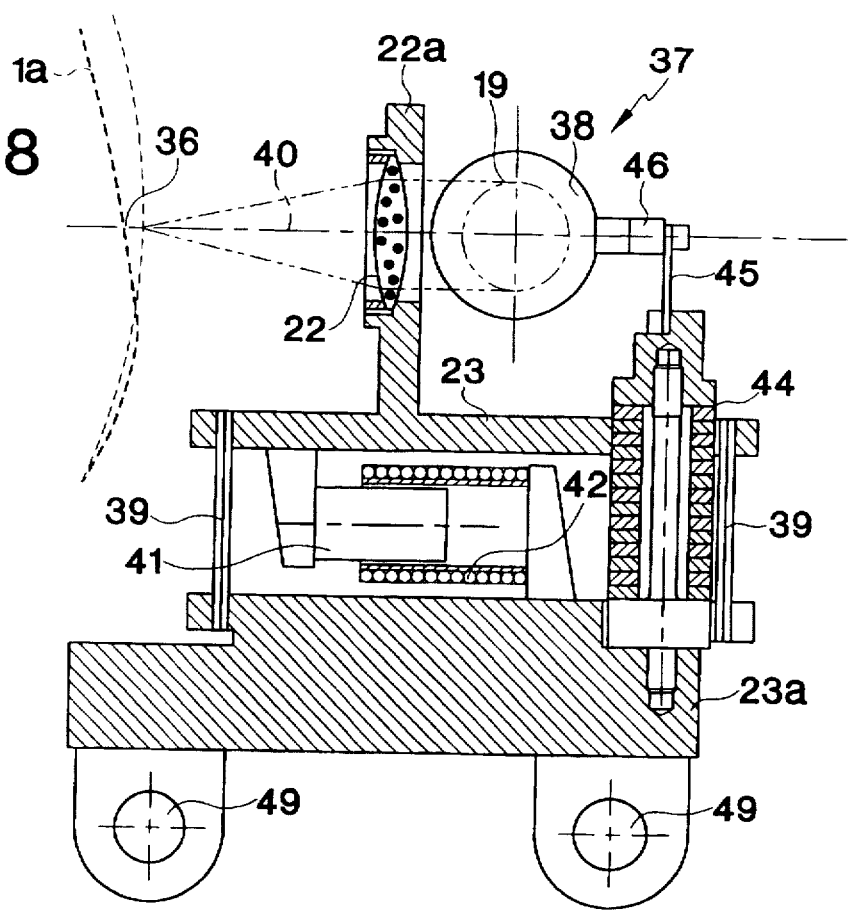
FIG. 8 shows a side view of an optics carriage with electromechanical adjusting means.
Figure 9:
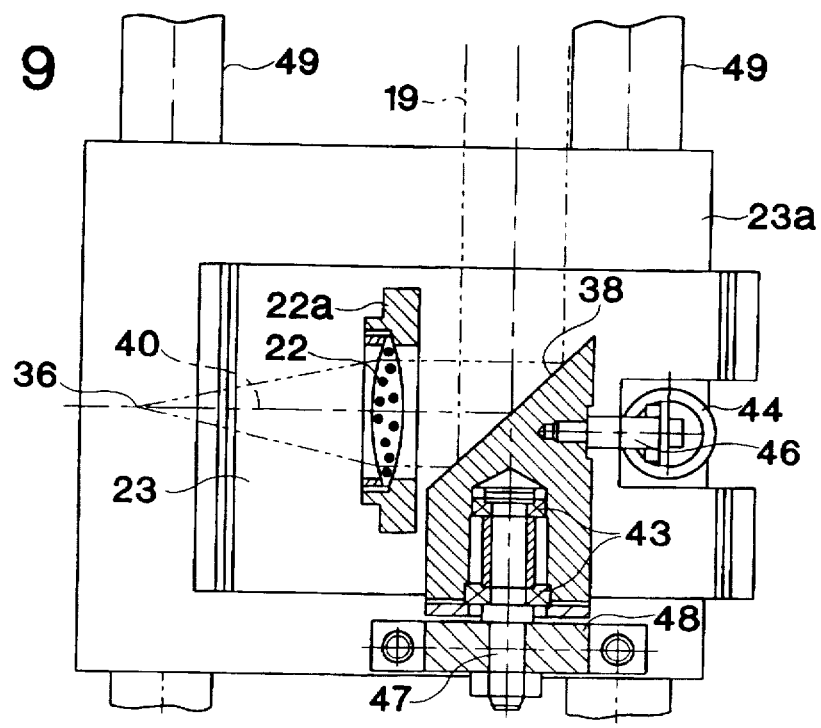
FIG. 9 shows a plan view of the optics carriage according to FIG. 8.

A possible way of adjusting an optical system 37 is shown in FIGS. 8 and 9. This system consists of the focussing lens 22, which is held by a lens mount 22a, and a moveable deflecting mirror 38. The lens mount 22a is held by leaf springs 39 which permit backlash-free movement of the lens mount 22a in the direction of the optical axis 40, but support the lens mount 22a in a relatively stiff fashion in all other directions. The leaf springs 39 are provided in the form of sets and it is possible owing to the dimensioning of the leaf springs to keep the displacement of the focussing lens 22, and thus of the focal point, within required tolerance limits in all directions perpendicular to the optical axis 40.

A positioning motor 41 ensures the movement of the lens 22 and of the lens mount 22a in the direction of the optical axis 40. In principle, the positioning motor 41 exhibits the design of a plunger coil. The control of the position of the lens 22 can be performed either by measuring the voltage across the coil 42 or by means of a ranging sensor know per se (not further represented), which continuously measures the position of the lens 22 or of the lens mount 22a permanently connected thereto. In the case of measurement of the coil voltage, the position is determined by means of the coil force, which increases with rising voltage and then deflects the leaf springs 39 every more strongly. It is also possible to provide a further spring, for example a preloaded helical spring, as an element amplifying the counterforce, so that the working point of a device can be kept as near as possible to the stretched position of the leaf springs 39, and also the tendency of the arrangement to vibrate can be kept low by the increase in the spring constants.

The control of the displacement of the focal point in the circumferential direction of the stencil 1 is performed by the deflecting mirror 38 which is supported on two precision ball bearings 43. The axis of rotation of these bearings 43 agrees with the beam axis of the beam 19 emitted by the laser 17. The direction of the beam guided by the lens 22 can be varied by swivelling the deflecting mirror 38, and the focal point can thereby be displaced on the stencil 1. The swivelling movement is initiated here by a piezoelectric actuating element 44 which acts with its upper end via a leaf spring 45 on a lever 46 of the deflecting mirror 38 and swivels the deflecting mirror 38 in the event of length changes in the actuating element 44. The deflecting mirror 38 is supported on the adjusting carriage 23a via a bearing bolt 47 and a bearing block 48. The fixed lower end of the piezoelectric actuator 44 is stiffly connected to the adjusting carriage 23a. This adjusting carriage 23a moves on round guides 49 parallel to the stencil axis 25.

Figure 10:
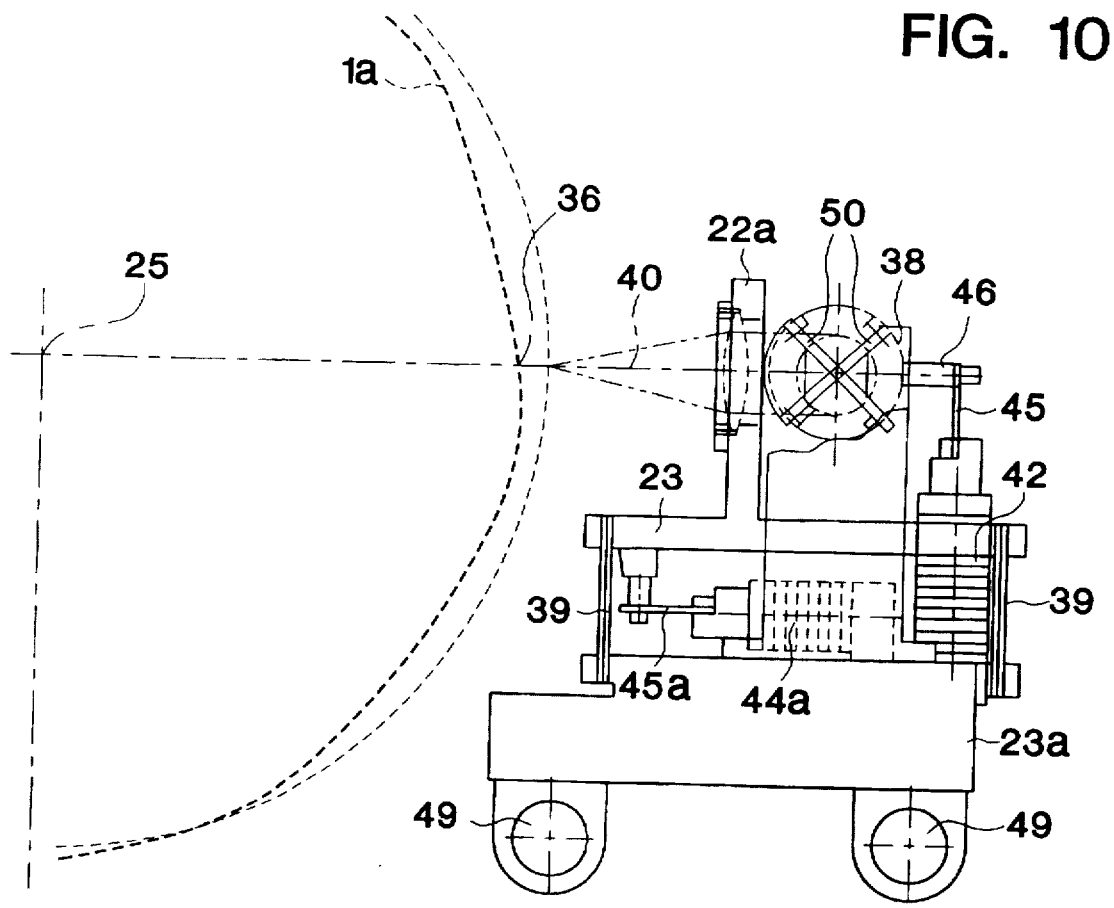
FIG. 10 shows a side view of a further optics carriage with electromechanical adjusting means.
Figure 11:
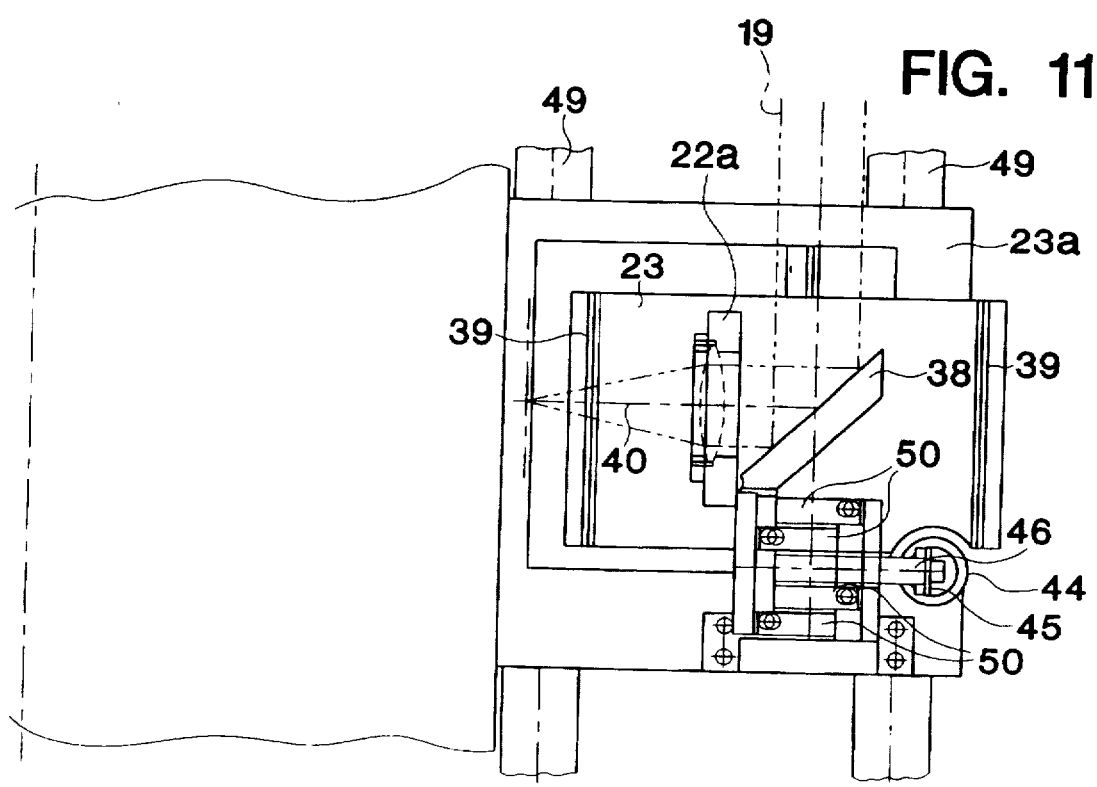
FIG. 11 shows a plan view of the optics carriage according to FIG. 10.

FIGS. 10 and 11 show a similar device in which, however, the deflecting mirror 38 is carried not by ball bearings but by cruciform springs 50. This bearing is distinguished by absolute freedom from backlash and a very high accuracy. However, in this case the positioning motor 41 is replaced by a further piezoelectric actuating element 44a with a leaf spring 45a. Otherwise, the same designations apply as in FIGS. 8 and 9.

Figure 12:
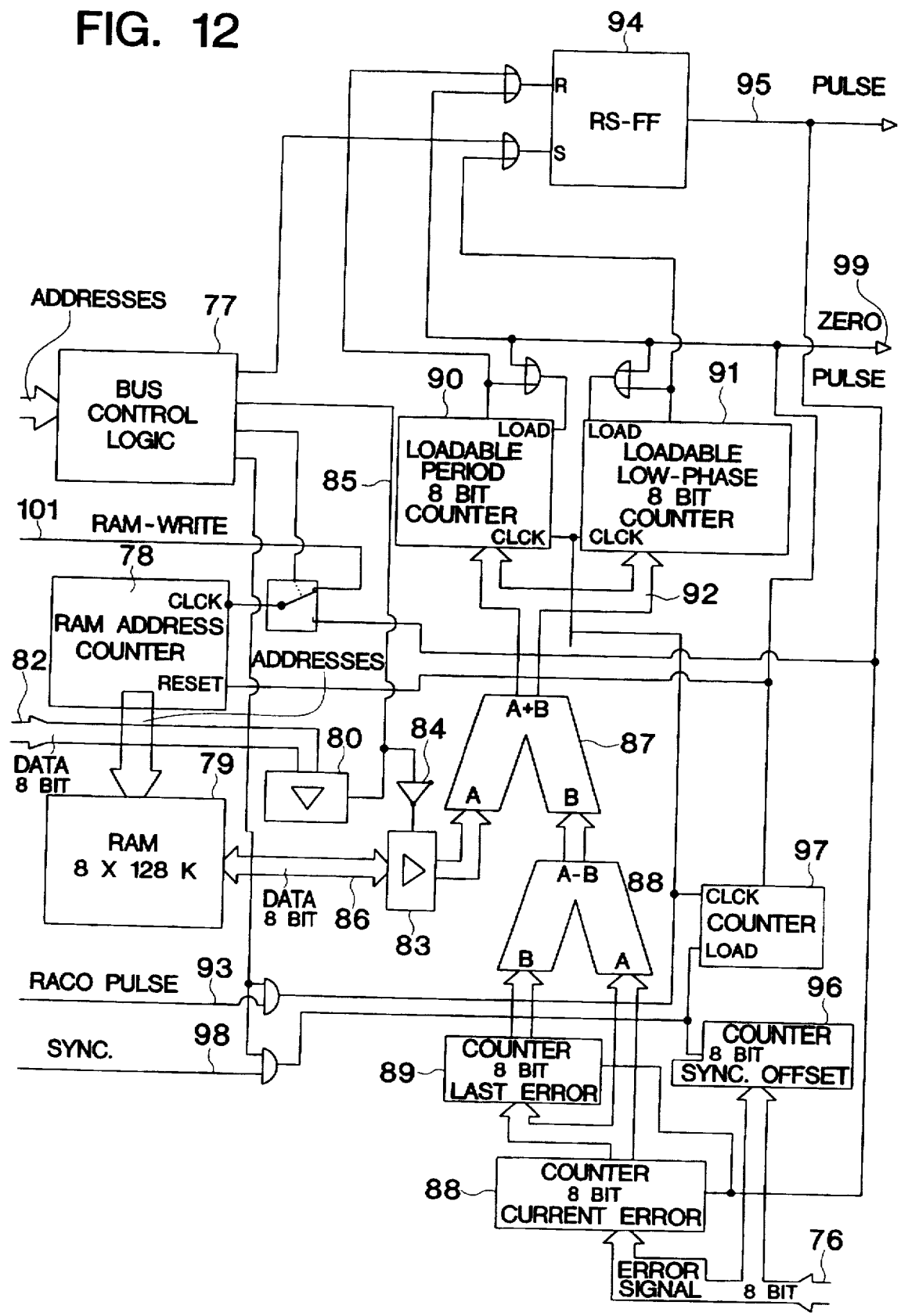
FIG. 12 shows a circuit arrangement which can be understood as an electrical adjusting device.

Represented in FIG. 12 is the circuit which effects a displacement of the pattern information in accordance with the incoming first actuating signal 76. A bus control logic 77 controls the first correct setting of an address counter 78 which also controls in the further sequence the setting of the correct address of a RAM 79. This RAM 79 is loaded via an 8-bit wide data bus 82 and a switchable driver 80, with a data record which contains the sequence of lengths of the pattern point intervals to be applied to the stencil. These are not all of the same length, since it is to be possible for any arbitrary number of pattern points to be applied to the circumference of the stencil, and this is possible only by means of a preselected sequence of slightly different interval lengths. The driver 80 can be opened or blocked via a signal line 85, and at the same instant a further driver 83, which is connected via an inverter 84 to the same signal line 85, is blocked or opened. This amounts to nothing other than that at an instant the RAM 79 can either only be loaded or only be read. If the driver 83 is open, the driver 80 is blocked and vice versa.

The interval length is led from the RAM 79 via a data bus 86 and the driver 83 to the input A of an adder 87. The input B of this adder 87 receives a difference signal from the subtractor 88, which is formed as follows. Digitized error signals are fed from a sensor measuring device according to FIG. 2 to a first storage element 89 via the data bus 76. In the case of each impulse transmitted by the entire unit, this storage element 89 stores the signal currently present and leads the error signal stored in the preceding period to a second storage element 89, whose output leads to the input B of the subtractor 88. In this way, the subtractor 88 determines in the case of each pulse the difference between two successive error signals, and supplies this to the input B of the adder 87. The desired interval length is now increased or decreased precisely by this difference if the difference is positive or negative, respectively. The interval length corrected in this way is transferred to a period counter 90.

At the same time, a transfer is also performed to the low-phase counter 91 by means of a signal which is shifted by hardware and thereby set at half the value. The hardware shifting is performed by a data bus 92, which is reduced from 8 to 7 bits and in which the higher value lines are connected to the counter 91 by one bit lower in each case, and the least significant bit is not connected at all. The two counters 90 and 91 are now decremented by the incoming encoder pulses 93 and each given an output pulse to the flip flop 94 upon reaching the zero state. The counter 90 acts on the R input of the flip flop 94, as a result of which the output 95 thereof goes to the low level. The S input of the flip flop 94 is operated by the counter 91 approximately at half the period, as a result of which the output on the flip flop assumes the high level.

In this way, the output 95 conducts a pulse signal which is corrected by the first actuating signal and in whose cycle it is now possible to read out a memory (not further represented) for the engraving pattern. The memory module 96 and the counter 97 connected by a bus to it serve to correct the input zero signal 98 and effect the output of an output zero pulse 99 corrected by the first actuating signal. The RAM address counter 78 is controlled by the corrected output pulses of the output 95. A digital changeover switch controlled by the bus control logic 77 receives the first count signal via a RAM-write line 101 only upon starting the unit, and all other counting pulses are the already corrected output pulses of the circuit arrangement.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for producing a screen printing stencil comprising:

means for rotatably mounting a hollow cylinder having a light responsive layer on an outer surface thereof;

a laser outputting a laser beam;

an optical system focusing said laser beam onto said light responsive layer;

an adjusting carriage for moving the focus of said laser beam parallel to the cylinder axis of said hollow cylinder;

means for switching said laser on and off in accordance with a desired stencil pattern;

at least one sensor in a fixed radial position measuring a distance to said hollow cylinder; and means for deriving a tangential displacing signal from said distance and outputting said tangential displacing signal to said adjusting carriage, wherein a tangential deviation of said hollow cylinder from an ideal position is compensated.

2. The apparatus according to claim 1, further comprising an optical carriage for moving said optical system in a radial direction of said hollow cylinder and means for deriving a radial displacing signal from said distance and outputting a radial displacing signal to said optical carriage, wherein a radial deviation of said hollow cylinder from an ideal position is compensated.

3. The apparatus according to claim 2, wherein said tangential displacing signal equals said radial displacing signal shifted in phase by a quarter revolution.

4. The apparatus as claimed in claim 3, wherein said means for deriving said tangential displacing signal ensures an earlier or later retrieval of said desired stencil pattern.

5. The apparatus as claimed in claim 1, wherein said at least one sensor comprises three sensors arranged at opposite different circumferential points of said hollow cylinder, said three sensors being attached to said adjusting carriage.

6. The apparatus as claimed in claim 1, wherein said adjusting carriage comprises electromechanical adjusting means for deflecting said laser beam impinging on said hollow cylinder in the circumferential direction of said hollow cylinder.

* * * * *